(12) United States Patent
Johnson et al.

(10) Patent No.: US 8,060,235 B2
(45) Date of Patent: Nov. 15, 2011

(54) SAW ADJUSTMENT MECHANISM

(76) Inventors: Kevin M Johnson, Natick, MA (US);
Paul C. M. Hilton, Millis, MA (US);
Matthew D. Abelson, Boylston, MA (US)

( * ) Notice: Subject to any disclaimer, the term of this patent is extended or adjusted under 35 U.S.C. 154(b) by 34 days.

(21) Appl. No.: 11/841,804

(22) Filed: Aug. 20, 2007

(65) Prior Publication Data
US 2008/0110314 A1    May 15, 2008

Related U.S. Application Data

(60) Provisional application No. 60/822,826, filed on Aug. 18, 2006.

(51) Int. Cl.
*G06F 19/00* (2011.01)
(52) U.S. Cl. ........................ 700/160; 30/166.3; 83/471.3
(58) Field of Classification Search ................... 700/160, 700/186, 192; 30/166.3; 83/471.3, 473, 83/477, 490, 508, 2, 508.3, 498, 499
See application file for complete search history.

(56) References Cited

U.S. PATENT DOCUMENTS

| | | | |
|---|---|---|---|
| 4,011,782 A | 3/1977 | Clark et al. | |
| 4,537,105 A * | 8/1985 | Bergler | 83/471.3 |
| 4,576,076 A * | 3/1986 | Pyle | 83/471.3 |
| 4,805,504 A | 2/1989 | Fushiya et al. | |
| 5,042,348 A | 8/1991 | Brundage et al. | |
| 5,370,025 A | 12/1994 | Itzov | |
| 5,418,729 A | 5/1995 | Holms et al. | |
| 5,445,056 A * | 8/1995 | Folci | 83/100 |
| 5,957,021 A | 9/1999 | Meredith et al. | |
| 6,758,123 B2 * | 7/2004 | Svetlik et al. | 83/471.3 |
| 7,669,510 B2 * | 3/2010 | Imamura et al. | 83/471.3 |
| 2002/0020262 A1 | 2/2002 | Gass et al. | |
| 2002/0059855 A1 | 5/2002 | Gass et al. | |
| 2006/0000329 A1 | 1/2006 | Terashima et al. | |
| 2006/0042442 A1 | 3/2006 | Ushiwata et al. | |
| 2006/0101965 A1 | 5/2006 | Carroll et al. | |
| 2006/0111809 A1 | 5/2006 | Etter et al. | |
| 2006/0162523 A1 | 7/2006 | Hetcher et al. | |

OTHER PUBLICATIONS

International Search Report and Written Opinion issued in related International Patent Application No. PCT/07/76341 dated Apr. 17, 2008 (17 pages).

* cited by examiner

*Primary Examiner* — Albert DeCady
*Assistant Examiner* — Chad Rapp
(74) *Attorney, Agent, or Firm* — Grossman, Tucker, Perreault & Pfleger, PLLC

(57) ABSTRACT

The present invention relates to a saw including a sawhead pivotably connected to a base. The pivotable connection may define a pivot axis therethrough, wherein the pivot axis may be parallel to the horizontal plane. In addition, the sawhead may rotate around the pivot axis and may be axially displaceable along the pivot axis.

31 Claims, 31 Drawing Sheets

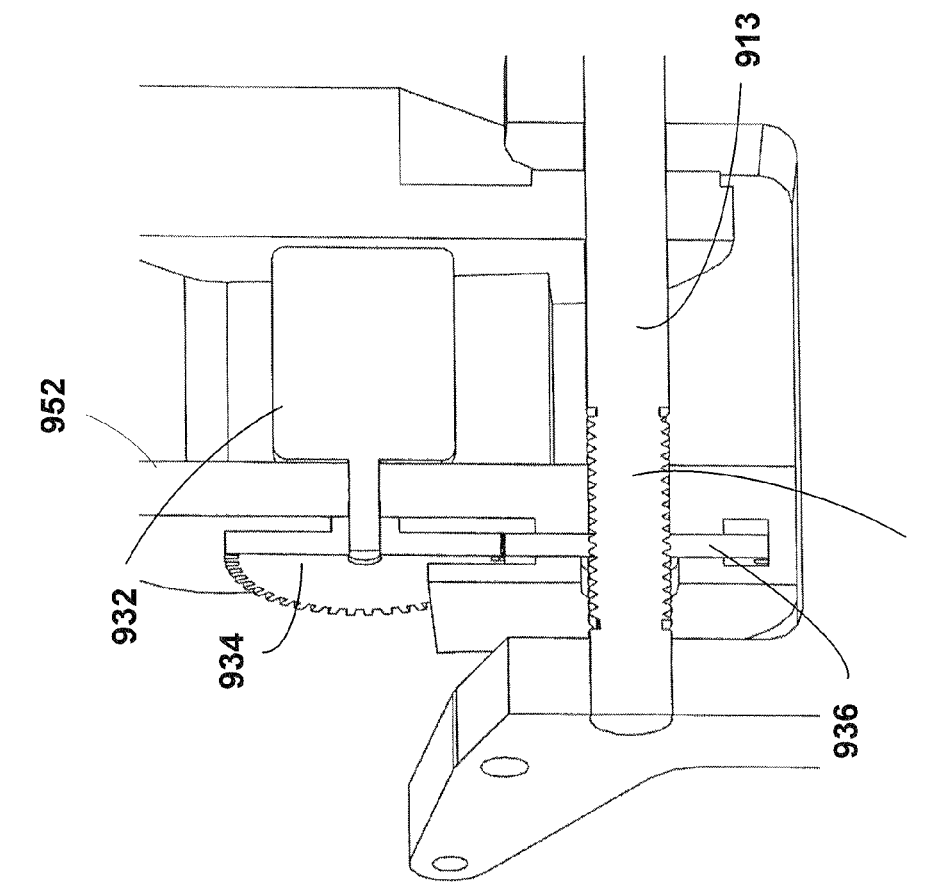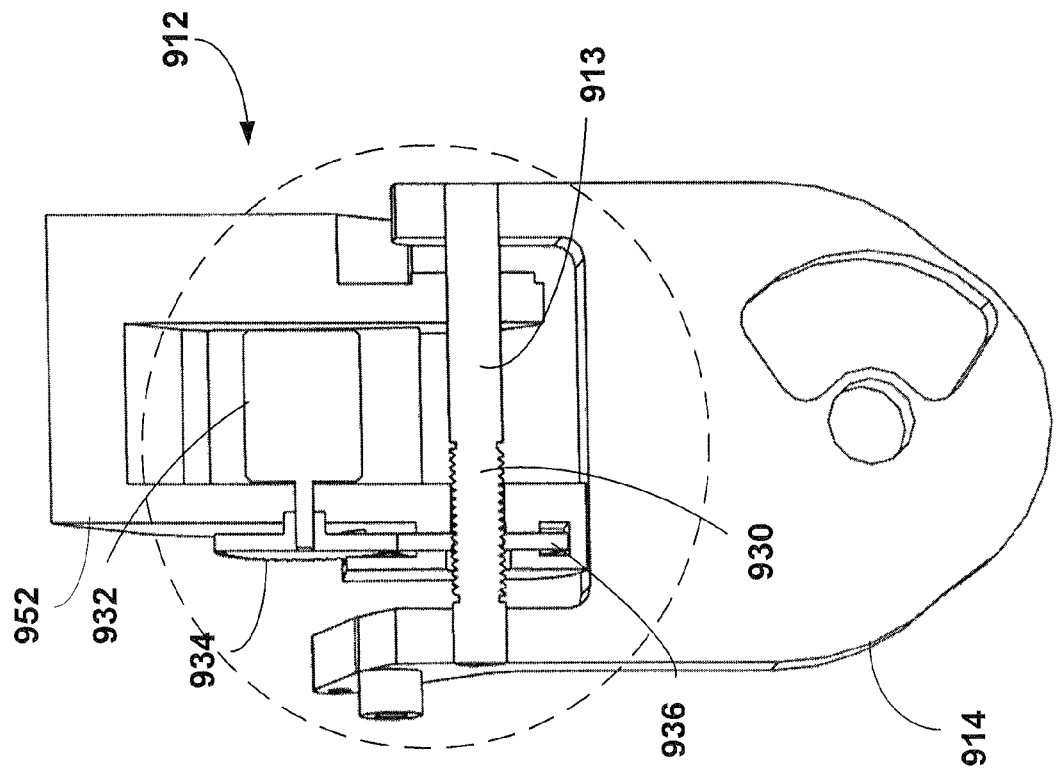
FIG. 9c
FIG. 9b

SAW ADJUSTMENT MECHANISM

CROSS REFERENCE TO RELATED APPLICATIONS

The present application claims the benefit of the filing date of U.S. Provisional Application Ser. No. 60/822,826, filed Aug. 18, 2006, the teachings of which are incorporated herein by reference.

FIELD OF INVENTION

The present invention relates to an adjustment mechanism for cutting devices. In particular, the present invention relates to an adjustment mechanism for a chop saw, miter saw, compound saw, sliding compound miter saw or combinations thereof.

BACKGROUND

A chop saw (also a miter saw, a compound miter saw, a sliding compound miter saw, etc.) is a power tool, which may be used to make a quick crosscut in a workpiece, such as a piece of lumber, trim, etc. It may be used to cut wood, although some plastics and light metals may also be cut with the tool. Common uses include framing operations and the preparation of crown molding or other types of trim. A chop saw may be considered a lightweight circular saw mounted on a spring-loaded pivoting arm supported by a metal base. Chop saws may be relatively small and portable, with common blade sizes ranging from eight to twelve inches. While these relatively small saws may not have the cutting capacity of a radial arm saw, they may be very portable and rugged enough to stand up to daily use (and abuse) on the job.

Depending on the chop saw, a number of cuts may be made. For example, a basic chop saw may cut a workpiece at a 90° angle or perpendicular to the table supporting the work piece. A miter saw may allow for rotation of the saw head relative to the workpiece, thus, providing angular cuts within a given range, common angles may include 15°, 30°, or 45°. In addition, some chop saws, referred to as compound miter saws, may make bevel cuts, which may include cuts angled relative to the horizontal plane of the support table.

If you tilt the blade while cutting at an angle, these saws may be able to cut trim or molding while the stock lies flat on the table. But tilting the blade means that there must be clearance at the fence when the saw head heels over. To achieve this, the height of the fence near the blade may be reduced, and users may be advised to add a supplemental wood fence when making regular cuts that may need extra-height support. In addition, sliding fence may be used, which provides full-height support and moves out of the way for bevel cuts.

Preset detent positions on the saw's turntable (typically set at 0, 15, 22.5, 30, and 45 degrees) may help to position the blade for common miter cuts. Some manufacturers also offer detents for the common crown molding angles on the miter and bevel scales. But the detents on some saws may be tricky to override if you want to make minute adjustments to the fit of a cut—say, a 32.25-degree miter instead of the 31.62 degrees that crown molding typically requires. The miter and bevel scales offered by different manufacturers may not be equally easy to read, either. For example, bevel scales may be partially hidden behind the body of the saw.

A number of steps may be taken to use a chop saw to create a cut on a workpiece. A workpiece may be marked for cutting with either a line or a mark. The workpiece may then be placed on the chop saw table with two hands and positioned with two hands such that the line or mark is approximately in line with the blade. One hand may be released from the workpiece to grip the handle of the saw while the second hand continues to hold the workpiece down and against the fence of the chop saw. The saw head may be lowered with the blade either stationary or running to touch down on the workpiece to see how much adjustment of the workpiece is necessary to line the blade with the mark. The saw head may then be released back to the "up" position and both hands may be placed back on the workpiece to adjust it relative to the blade. (It is usually very difficult to accurately adjust a workpiece of any size with one hand.)

The steps of releasing one hand from the workpiece, lowing the saw head with that hand to determine the degree of adjustment necessary to make a proper cut, and then readjusting the workpiece may be repeated until the workpiece is properly positioned (this frequently takes 3-4 iterations). A cut may then be made by turning on the saw and pulling the chop saw through the workpiece.

To help with gross positioning, some saws may be equipped with a laser. With a laser, the saw blade may not need to be brought down to the work piece during adjustment. However, the laser may have a finite width and determining very accurate cuts through the laser alone may be difficult. Also, an iterative process is still required to finely adjust what could be a large, heavy workpiece to a laser line.

In addition, cutting a workpiece to less than $\frac{1}{32}$" (0.032") of its ideal length may require an extensive amount of time positioning the work piece to get an accurate cut. The number of iterations to get an accurate cut may be increased by the fact that a user needs to be conservative in determining where he/she makes a cut; you can always cut more off, but you can't add it on.

SUMMARY

An aspect of the present disclosure relates to a saw. The saw may include a base portion including a horizontal plane configured to support a workpiece. The saw head may be pivotably connected to the base, wherein the pivotable connection may define a pivot axis therethrough. The pivot axis may be parallel to the horizontal plane. In addition, the sawhead may rotate around the pivot axis and may be axially displaceable along the pivot axis.

Another aspect of the present disclosure relates to an article for use with the above indicated saw. The article may include a storage medium having stored thereon instruction that when executed by a machine result in the operations of detecting a cutting location of a workpiece and moving a saw head including a blade along a pivot axis to align the blade with the cutting location. The alignment may therefore include axial displacement along the pivot axis.

A further aspect of the present disclosure relates to an article comprising a storage medium having stored thereon instruction that when executed by a machine result in the operations of determining an angle of a blade relative to a horizontal plane, the horizontal plane defining an opening therein, determining the free travel of the blade at said angle with the opening, calculating an axial total travel distance of the blade with respect to the opening, and limiting the axial total travel distance of the blade with respect to the opening due to the angle of the blade.

BRIEF DESCRIPTION OF THE DRAWINGS

The detailed description below may be better understood with reference to the accompanying figures which are provided for illustrative purposes and are not to be considered as limiting any aspect of the invention.

FIG. 3b is a front cross-sectional view of the mechanism of FIG. 3a.

FIG. 5b is a cross-sectional view of the adjusting mechanism of FIG. 5a.

FIG. 8b is a front view of the adjusting mechanism of FIG. 8a.

FIG. 9b is a perspective cross-sectional view of the adjusting mechanism of FIG. 9a.

FIG. 9c is a close-up of the encircled portion of FIG. 9b.

FIG. 9d is a front cross-sectional view of the mechanism of FIG. 9a.

FIG. 9e is a front view of the adjusting mechanism of FIG. 9a.

FIG. 10b is a front view of the adjusting mechanism of FIG. 10a.

FIG. 11b is a front view of the adjusting mechanism of FIG. 11a.

FIG. 12b is a front view of the adjusting mechanism of FIG. 12a.

FIG. 13b is a front view of the mechanism of FIG. 13a.

DETAILED DESCRIPTION

The current disclosure relates to an apparatus, system and method for adjusting a chop saw or similar saw (sliding compound miter saw, compound saw, miter saw, etc.) without the cumbersome steps of iteratively adjusting the workpiece position.

Figure 1:
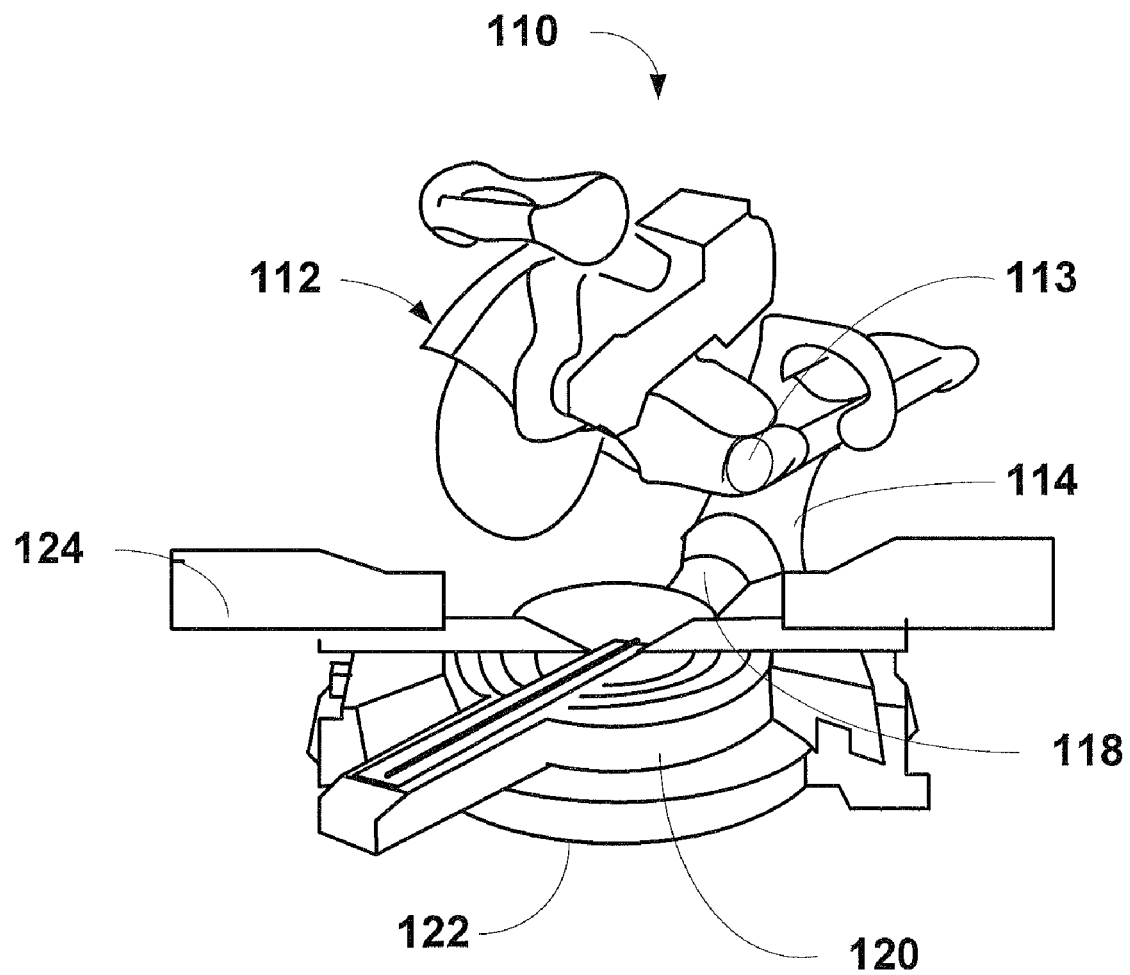
FIG. 1 is an illustration of an example of a chop saw.

As mentioned above and illustrated in FIG. 1, nearly all chop saws 110 may rotate the saw head 112 around a pivot 113 to provide the chopping/cutting motion. This pivot may be created between the saw head, or an arm attached to the saw head, and an interim housing 114, typically a casting. The pivot may be created through means of a pin/shaft which may be made of steel or other sufficiently strong material. This interim housing, in turn, may be pivotably connected to another part, a turntable 120. This pivot 118 provides for the "bevel" angular adjustment. Finally, the turntable 120 may be pivotably connected to the base 122. Rotating the turntable with respect to the base moves the entire saw head and all other parts (besides the base) to provide a second angular adjustment, the miter angle. In a sliding compound miter saw, the saw head is enabled with an additional linear degree of freedom to move in the plane of the blade along the cutting line to facilitate the cutting of bigger pieces of wood. In products such as these, the saw head/arm still has an angular degree of freedom to bring it down to the workpiece. An additional degree of freedom between the saw arm/head 112 and the interim housing 114 along the chopping pivot axis (CPA) may be provided as described herein.

Figure 2:
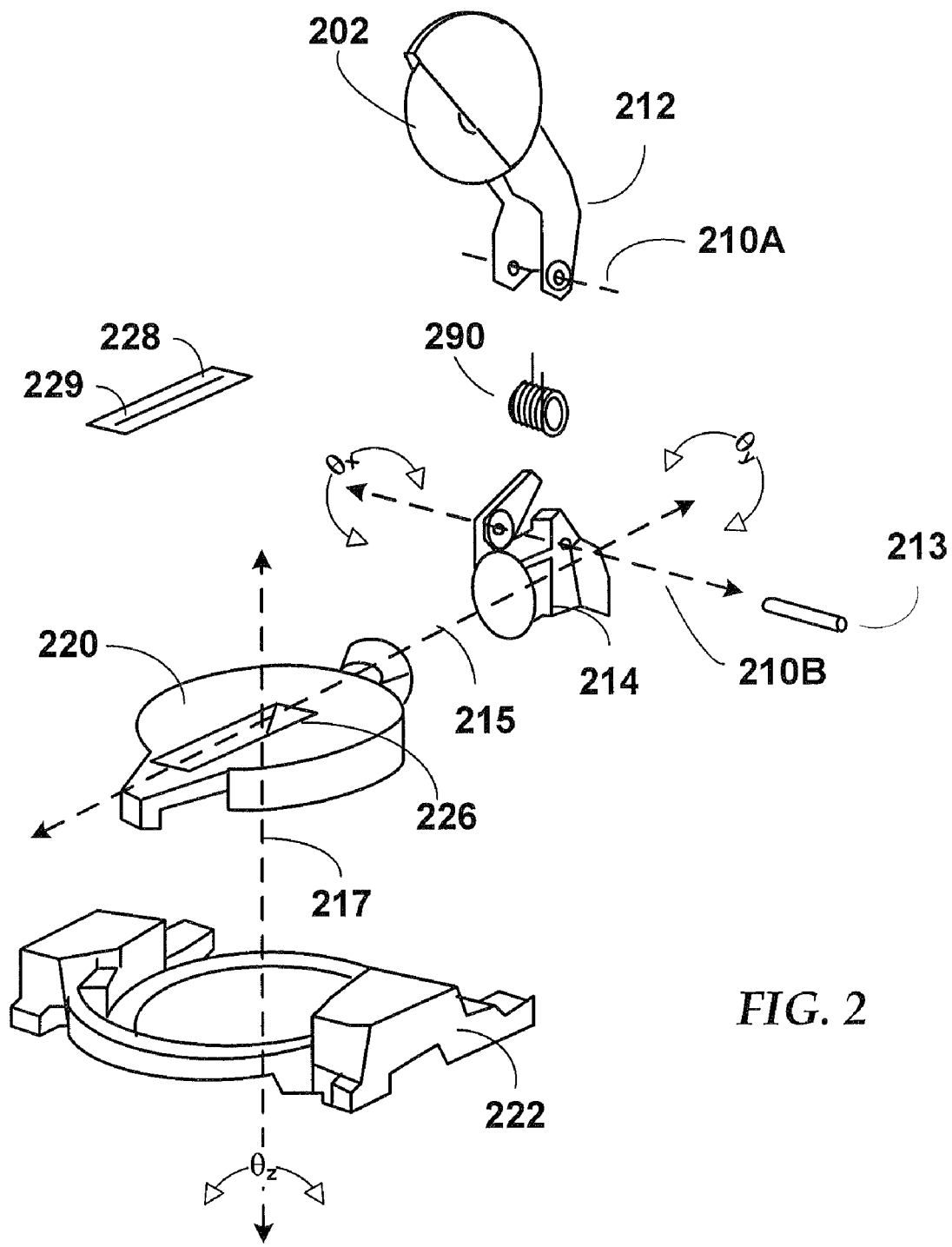
FIG. 2 is an exploded view of a chop saw, including the various axes that may be consistent with a chop saw or miter saw.

FIG. 2 illustrates an exploded view of an exemplary saw further describing and illustrating the various possible pivot axes. A first pivot axis illustrated by lines 210A and 210B may be located at the chopping pivot axis. This pivot may be parallel to the horizontal plane of the turntable 220 (when the saw head is at an at rest condition with the saw blade perpendicular to the turntable 220) and allow the saw head 212 to move or rotate towards the workpiece, illustrated by the angular degree of freedom $\theta_x$. This rotational pivot axis may be provided by the interaction between the chop pivot pin 213, the saw head 212 and the interim housing 214. In addition, a torsion spring 290 may be provided around the chopping pivot pin, as described below.

A second pivot axis 215 may be provided between the interim housing and the turntable 220. This pivot axis allows for angling of the saw head 212 relative to the horizontal plane of the table, illustrated by angular degree of freedom $\theta_y$. Such angling may provide for bevel cuts of the workpiece.

A third pivot axis 217 may be located perpendicular to the horizontal plane of the turntable 220, allowing the turntable 220, interim housing 214 and saw head 212 to rotate around the base 222, illustrated by angular degree of freedom $\theta_z$. As the fence (shown in FIG. 1 as 124) is attached to the base 222, and the workpiece is aligned to the fence, this pivot allows the saw head to rotate relative to the workpiece. Such rotation may provide for miter cuts of the workpiece.

In addition to the above, contemplated herein is a mechanism to position the saw head axially (e.g. left to right or right to left) along the chopping pivot axis 210. The location of saw arm/head relative to the interim housing may be adjusted manually or by a motor which may be controlled by the user.

The user may place a workpiece against the fence without precisely aligning the region to be cut with the blade. The user may locate the marked area to be cut on a workpiece in a broad zone on either side of the saw blade (e.g. ±1/8" or 1/4" or less, including all values and increments in the range of about 1/64" to 1/4"). Once this is done, the user may hold the workpiece against the fence with one hand and bring the saw blade down in close proximity with the surface of the workpiece with the other hand. A separate control, which may be, for example, a three-way switch controlled by a user's thumb on the handle, may allow the user to move the saw head back and forth along the chopping pivot axis to align the saw blade with a desired region to be cut, such as at a mark provided on the workpiece.

A number of mechanisms may be utilized to position the saw head relative to the interim housing or base. As alluded to above, these mechanisms may include motorized or manual adjustments positioning the saw head along the chopping pivot axis. In motorized structures, the motor may be mounted to any portion of the saw, including on the interim housing or base and the saw head, and interact another component to provide axial motion of the saw head along the chopping pivot axis. Furthermore, the mechanism herein may be configured so that it may not allow for displacement of the saw head axially (e.g. left to right or right to left) along the chopping pivot axis 210 while the saw blade is activated (turning) and/or when the saw blade may be engaged to a workpiece.

In addition, once the saw has reached a predetermined angular cutting or chopping position and is subsequently returned to a second predetermined angular cutting or chopping position (which may then indicate that a workpiece has been cut), the mechanism herein may automatically return the saw to a predetermined position along axis 210A or 210B. For example, the mechanism may return the saw head to a "home" position that may be specifically centered along axis 210A or 210B. Furthermore, in that situation where one may be using a sliding compound miter saw, the linear position of the blade in the sliding direction may also be accounted for (by e.g. a processor) when determining when to reset the blade to a desired axial position along axis 210A or 210B. The mechanism herein may also include a variety of other features, such as a "reset button" which may also reset the sawhead to a selected location along axis 210A or 210B, including a "lock out button" which may prevent the saw from automatically resetting to a "home" position. The mechanism herein may also include one that, when powered up, automatically finds a predetermined axial position along axis 210A or 210B.

The system herein may also be configured such that any motorized adjustment mechanism for axial positioning along axis 210A or 210B may be one that drives the saw to either extreme left or right position along the axial axis before selecting a "home" position. The system may also evaluate load on the motor that may be used to axially position the sawhead or an encoder count frequency which may then determine whether the motor has reached the end of a travel window along the axial axis 210A or 210B.

Figure 3A:
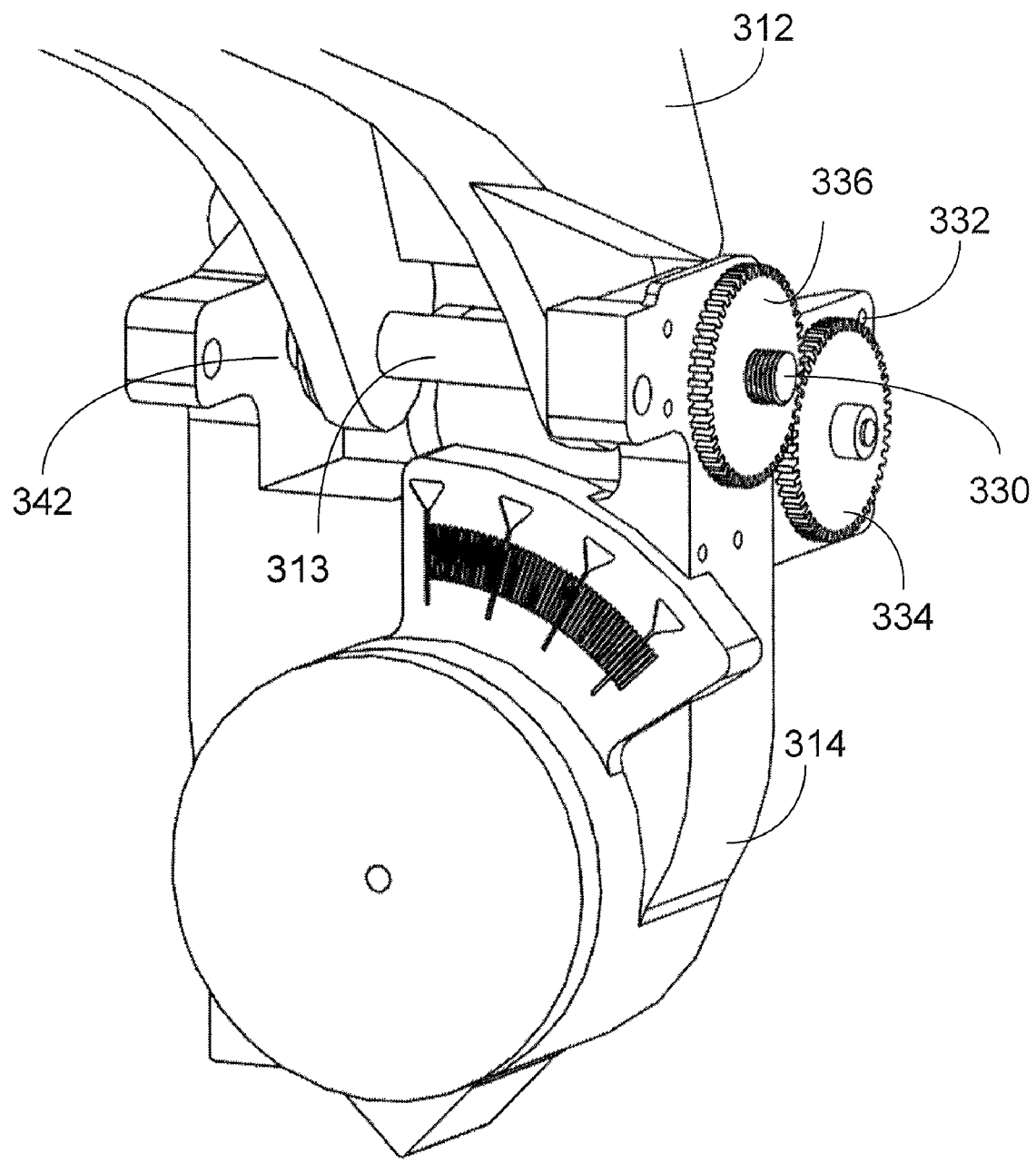
FIG. 3a is a perspective view of an example of an adjusting mechanism contemplated herein.
Figure 3C:
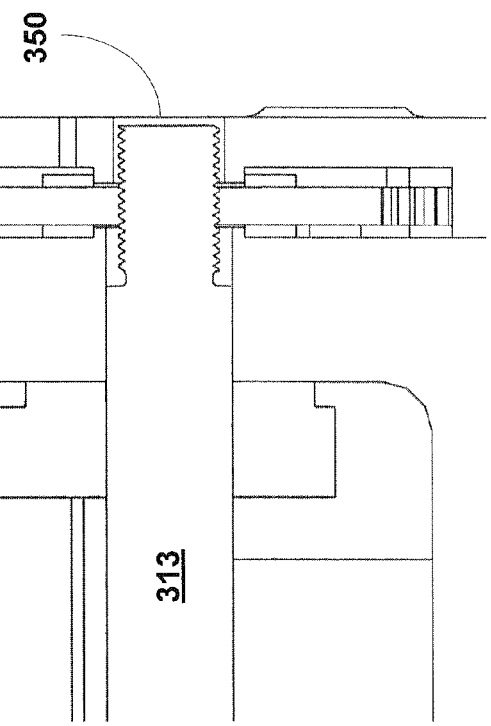
FIG. 3c is a close up of the encircled portion of FIG. 3b.
Figure 3B:
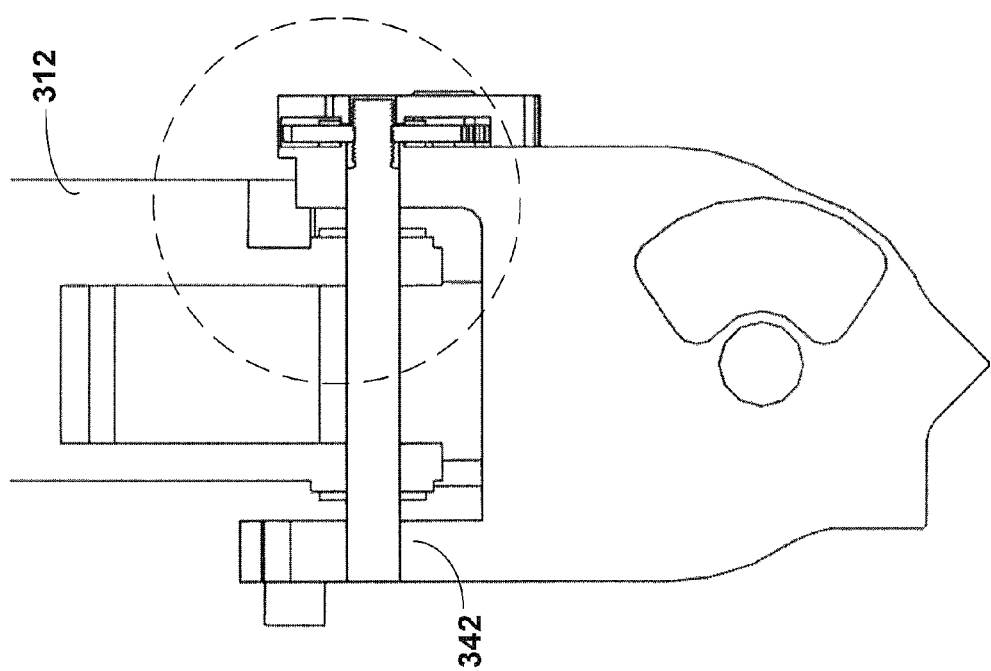

FIGS. 3a, b and c illustrate an embodiment, where the chopping pivot pin 313 may include threads 330 on at least a portion thereof. A drive motor 332 may be positioned on the base or interim housing 314. The shaft of motor 332 may be pinned or affixed to a first gear 334. The first gear 334 may interact with a second gear 336 having a threaded internal diameter. The threads of the second gear 336 may then interact with the chopping pivot pin 313 to axially adjust the pin along its axis (axis 210 illustrated in FIG. 2). Again, axial adjustment may be understood as an adjustment left to right or right to left—i.e. orthogonal to the blade plane. The second gear may axially constrained by the interim housing by cover 350. In addition, the pivot pin may move axially with respect to its axis but may be rotationally constrained, i.e., the pivot pin does not rotate about its axis. Furthermore, at least a portion of the pivot pin 313 may be keyed, i.e., wherein the pin includes a protrusion preventing rotation or is formed into a non-rotating geometry, such as a rectangle, triangle, square, etc. The interim housing may include a keyway at one or more support locations 342 for the pivot pin. The remainder of the pin may be cylindrical to allow for rotation of the saw head 312 about the pivot pin axis.

In addition, the saw head 312 may be constrained to the pivot pin such that the saw head moves axially with the pivot pin. For example, abutments may be provided on the pivot pin to fix the axial movement of the saw head 312 with respect to the pin 313. However, the saw head 312 may ride on the pivot pin 313 and be capable of rotating about the pivot pin axis. Furthermore, a portion of the pivot pin 313 may be rotationally constrained to the saw head 312, whereas another portion of the pivot pin 313 may be rotationally constrained with respect to the interim housing 314. Thus, the pivot pin may be supplied in, at least, two pieces, that is, the pivot pin 313 may be two or more pieces that are integrated to provide both a keyed portion and a rotating portion, where the keyed portion may be incapable of rotating with respect to the interim housing and the rotating portion may rotate with respect to the interim housing.

Figure 4A:
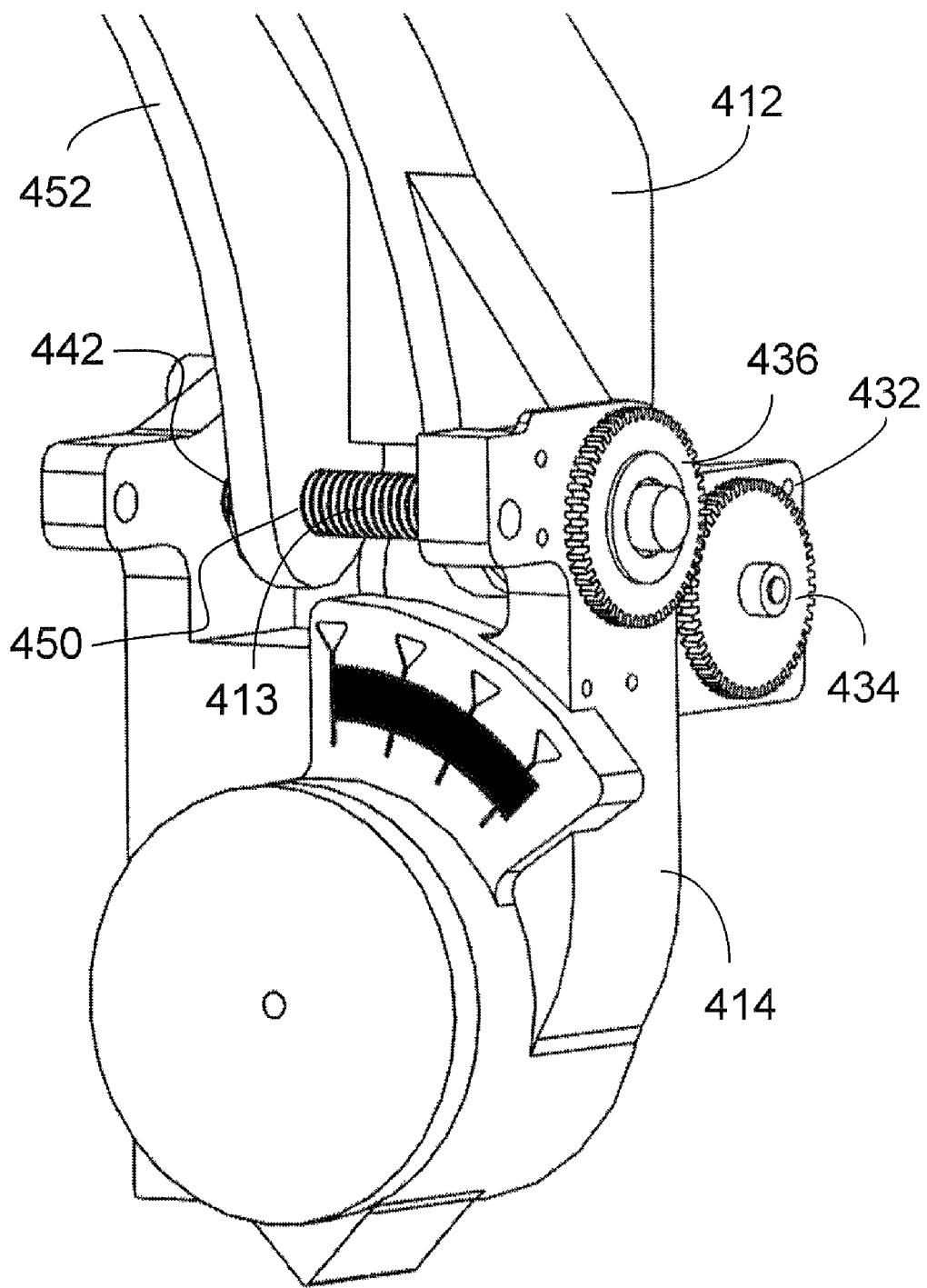
FIG. 4a is a perspective view of an example of an adjusting mechanism contemplated herein.
Figure 4B:
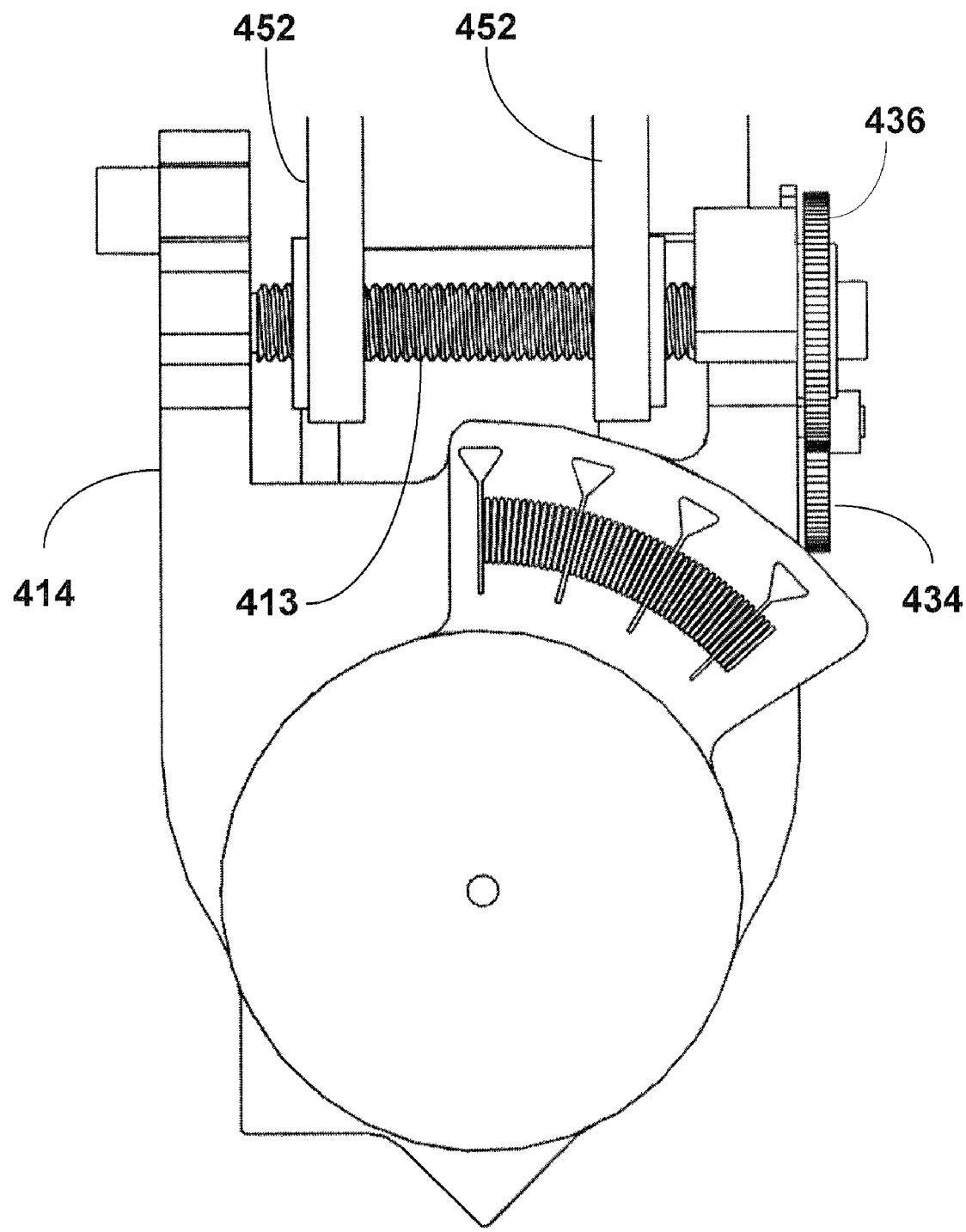
FIG. 4b is a front view of the adjusting mechanism of FIG. 4b.
Figure 4C:
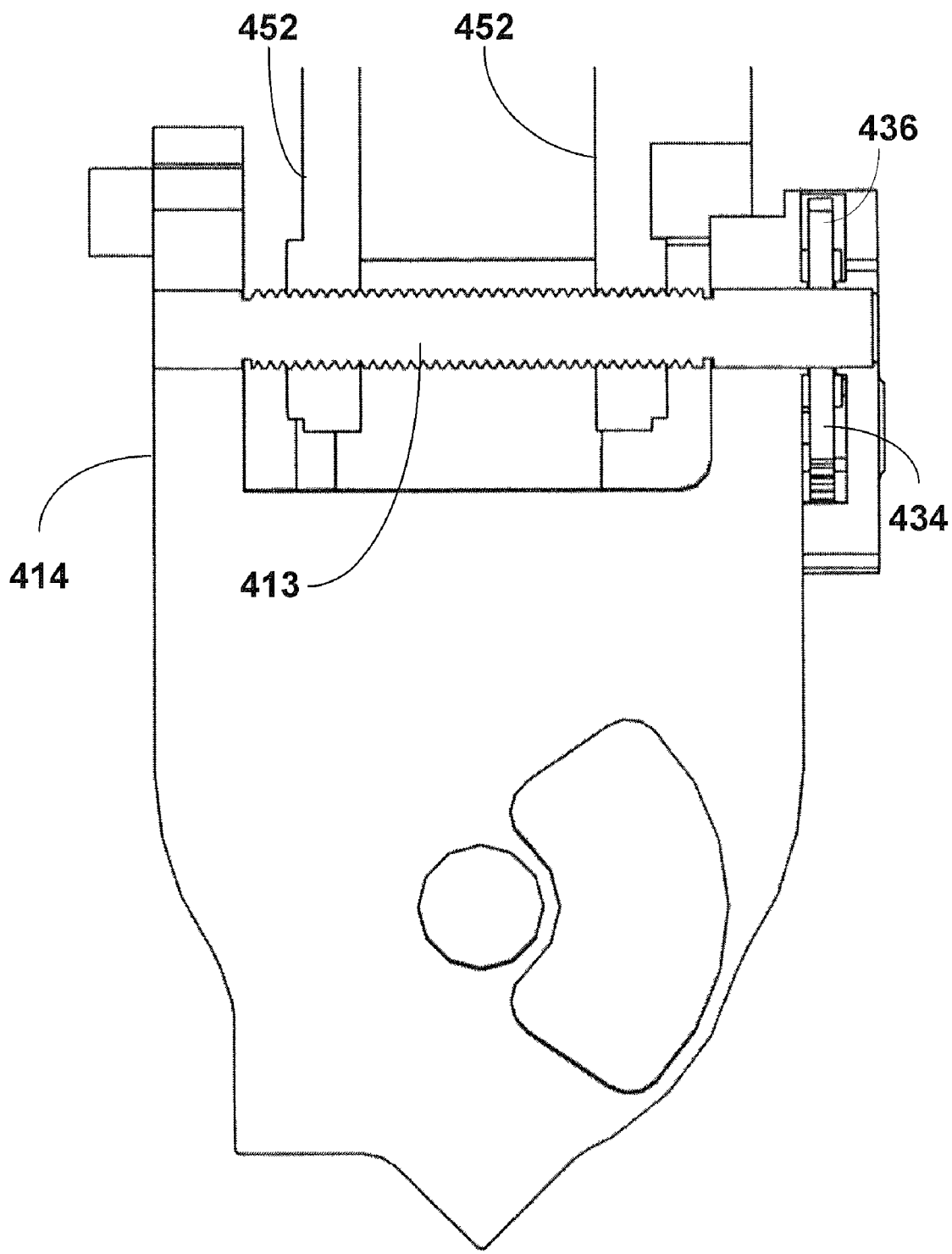
FIG. 4c is a cross-sectional view of the adjusting mechanism of FIG. 4c.

In addition to the above, FIGS. 4a, b and c illustrate an embodiment wherein the drive motor 432 may be mounted to the base or interim housing 414 and the pivot shaft or pin 413 may be threaded in a portion that engages with at least a portion of the saw arm bore. Once again, the shaft of drive motor 432 may be pinned to a first gear 434. The first gear 434 may then interact with a second gear 436, which may be rotationally constrained to the pivot pin 413. The second gear 436 and the pivot pin 413 may also be axially constrained to the interim housing 414. The bores 450 in the saw head arms 452 mounted to the pivot pin, may also include internal threads. As the motor turns the gears, the pivot pin 413 may rotate, causing the saw head 412 to move axially along the axis of the pivot pin 413. The saw head 412 may be rotationally constrained during rotation of the pivot pin 413 by a torsion spring (discussed below) mounted over the pivot pin and connected to the saw head 412 and interim housing 414.

It may be appreciated however, that in this arrangement, upon actuation of the saw head 412, i.e., the downward or upward rotation of the saw head 412, the saw head 412 may travel axially along the teeth of the pivot pin threads 413. Accordingly, in such an embodiment, a signal may be sent to the motor 432 indicative of the translation of the saw head 412 due to the upward or downward movement of the saw head 412. The motor 432 may then reposition the saw head 412 accordingly, i.e., rotate the pivot pin 413 in an appropriate direction until the saw head 412 is repositioned to a desired spot. The extent of repositioning may be determined by the amount the gears 434/436 or drive motor 432 is turned during positioning of the saw head 412.

In addition to the above, rather than to compensate for the axial translation of the saw head 412 upon activation, axial translation may be prevented. In such a manner, the drive system, i.e., motor, gears, etc., may be provided with backlash, or play within the drive system. For example, the backlash may allow for rotation of the saw head around the chopping pivot axis while rotating the pivot pin (wherein the pivot pin is not completely constrained to the interim housing or base) and disassociating the pivot pin from the gears. The degree of allowable backlash may therefore prevent translation of the saw head 412 along the pivot pin axis, (axis 210 illustrated in FIG. 2).

Another additional embodiment to prevent the axial translation of the saw head 412 upon activation, may be to provide a clutch in the drive system, such as in the motor or gears. When the saw head is lowered, the clutch may be released and the pivot pin may be free to rotate with the saw arm using inherent or induced friction between the arm and pivot pin to keep the arm and pivot pin together as the saw is lowered. Once the saw is returned to the upright position or power to the saw blade motor has been removed, the clutch may then again be engaged. For example, the pivot pin may be provided with a key, which may be disengaged when raising and lowering the saw head and engaged once in the raised and lowered positions.

Figure 5A:
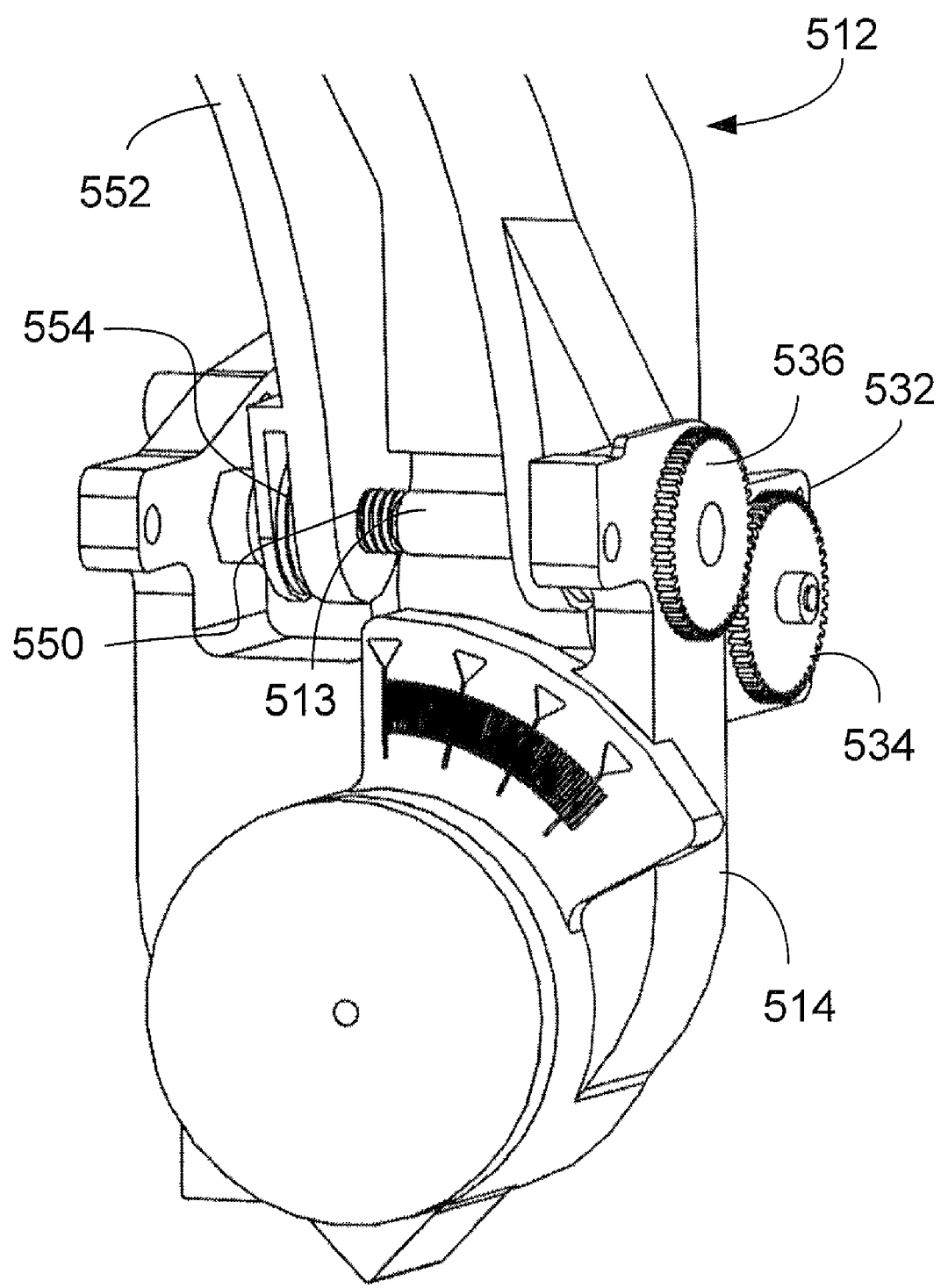
FIG. 5a is a perspective view of an example of an adjusting mechanism contemplated herein.
Figure 5B:
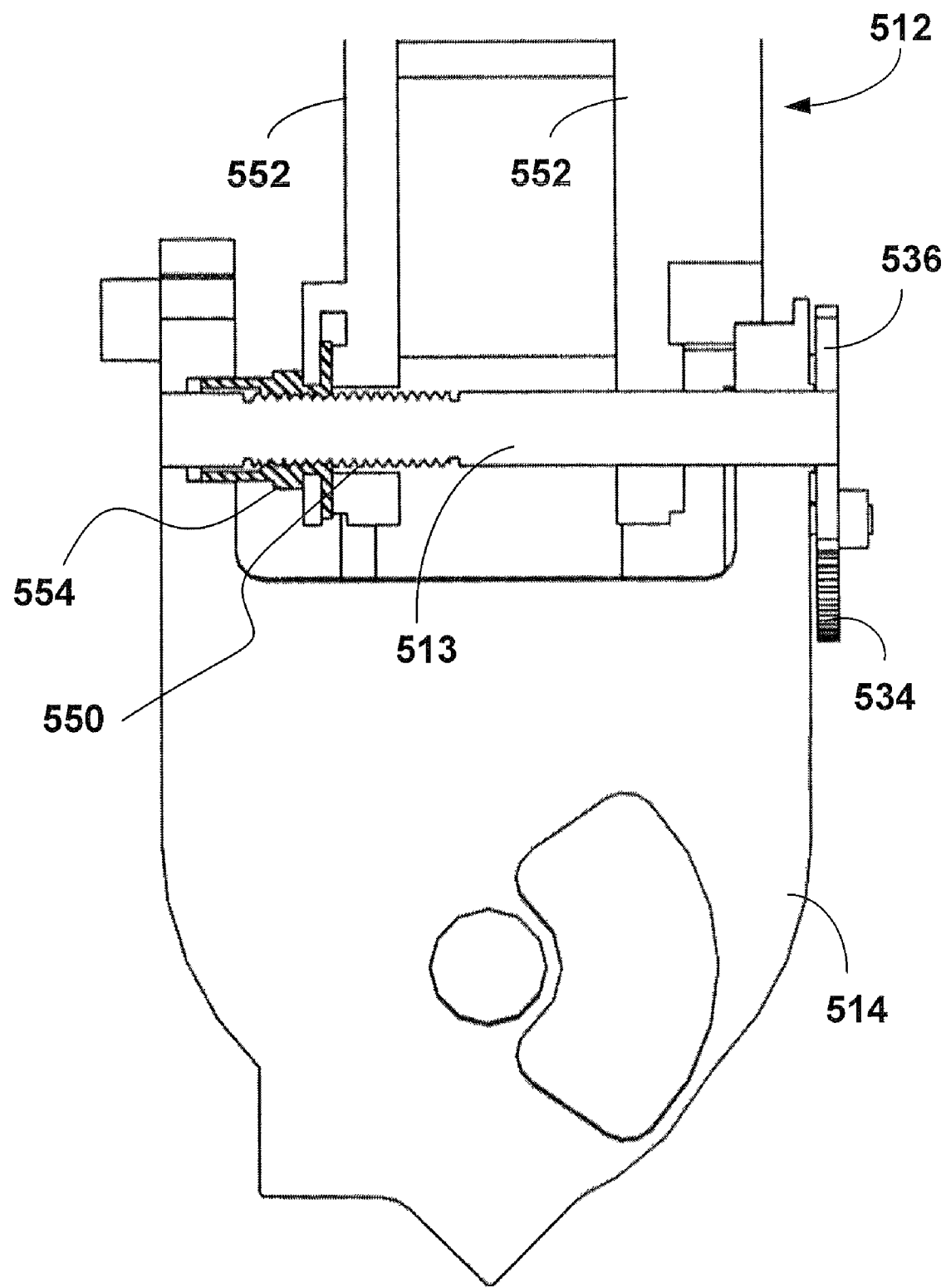

FIGS. 5a and b illustrate an embodiment where the drive motor may be mounted to the base or interim housing 514. The drive motor 532 may be pinned to a first gear 534 which may be axially and rotationally constrained to the motor shaft. The first gear 534 may drive a second gear 536 which may be pinned or rotationally and/or axially constrained to the pivot pin 513. The bores 550 of the saw head arm 552 may ride on the pivot pin 513 and may be affixed axially to a nut 554, which may have a threaded internal diameter. The threaded internal diameter of the nut 554 may interact with a threaded portion of the pivot pin 513. As the motor turns the gears, which in turn rotates the pivot pin, the threads of the pivot pin may interact with the nut moving the saw head in an axial direction along the chopping pivot axis. In one example, the interim housing or base may include stops to constrain the nut from rotating, yet allow the saw head to rotate upon actuation.

Figure 6:
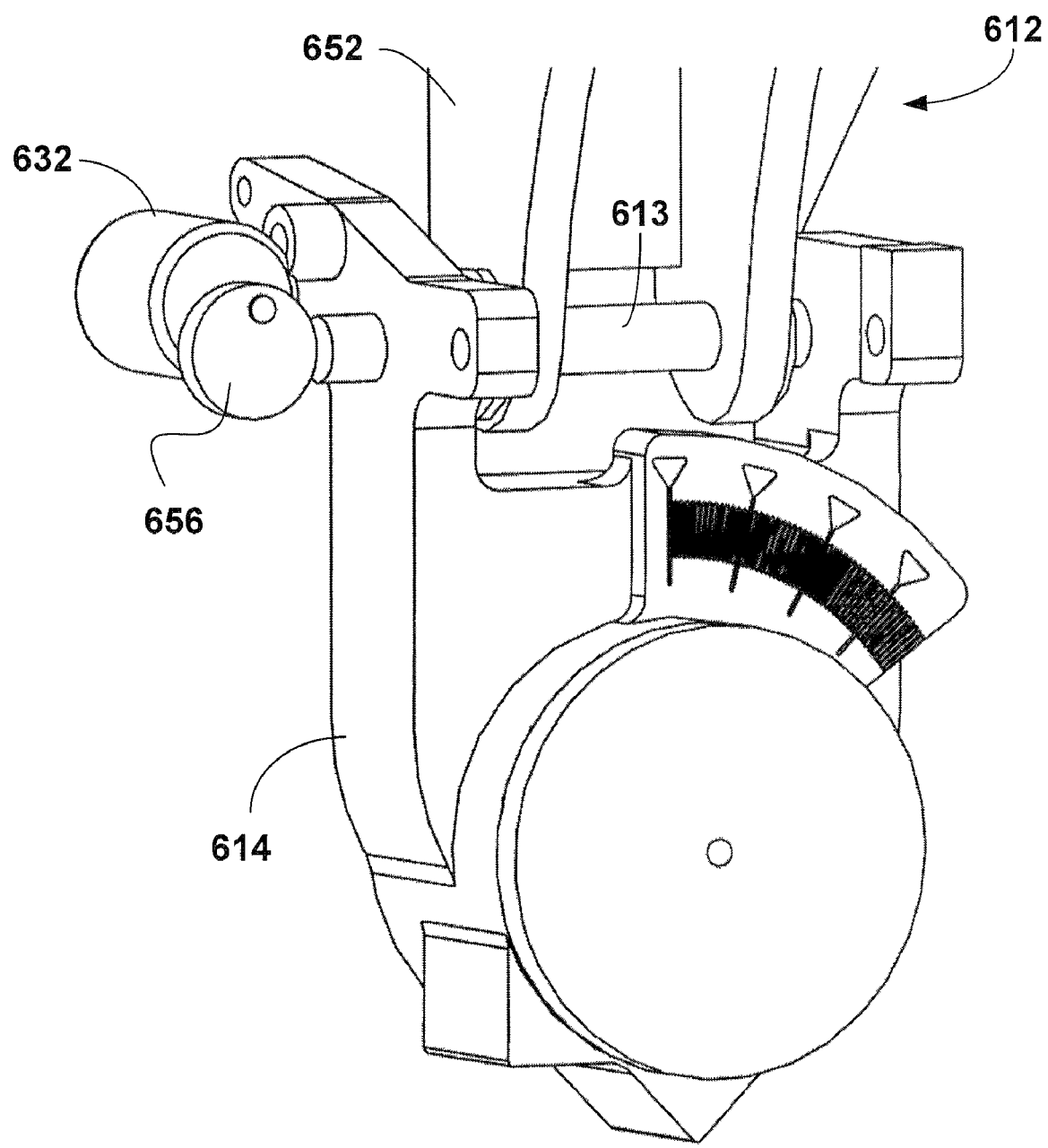
FIG. 6 is a perspective view of an example of an adjusting mechanism contemplated herein including a cam.

FIG. 6 illustrates an embodiment wherein the drive motor may be mounted to the base or interim housing 614. A cam 656 may be driven by the motor 632 and mounted to the pivot pin 613, such that as the cam 656 may act on the pivot pin 613 to drive the pin 613 forward and backward along the chopping pin axis in the interim housing or base. A spring may also be provided wherein the spring applies force against the pivot pin and cam. The saw head 612 may be axially constrained to the pivot pin, moving back and forth with the pin. In addition, the saw head 612 may rotate with respect to and around the pivot pin 613 or the saw head 612 may be rotationally fixed to the pivot pin 613 and the pivot pin 613 may rotate with the saw head 612.

Figure 7:
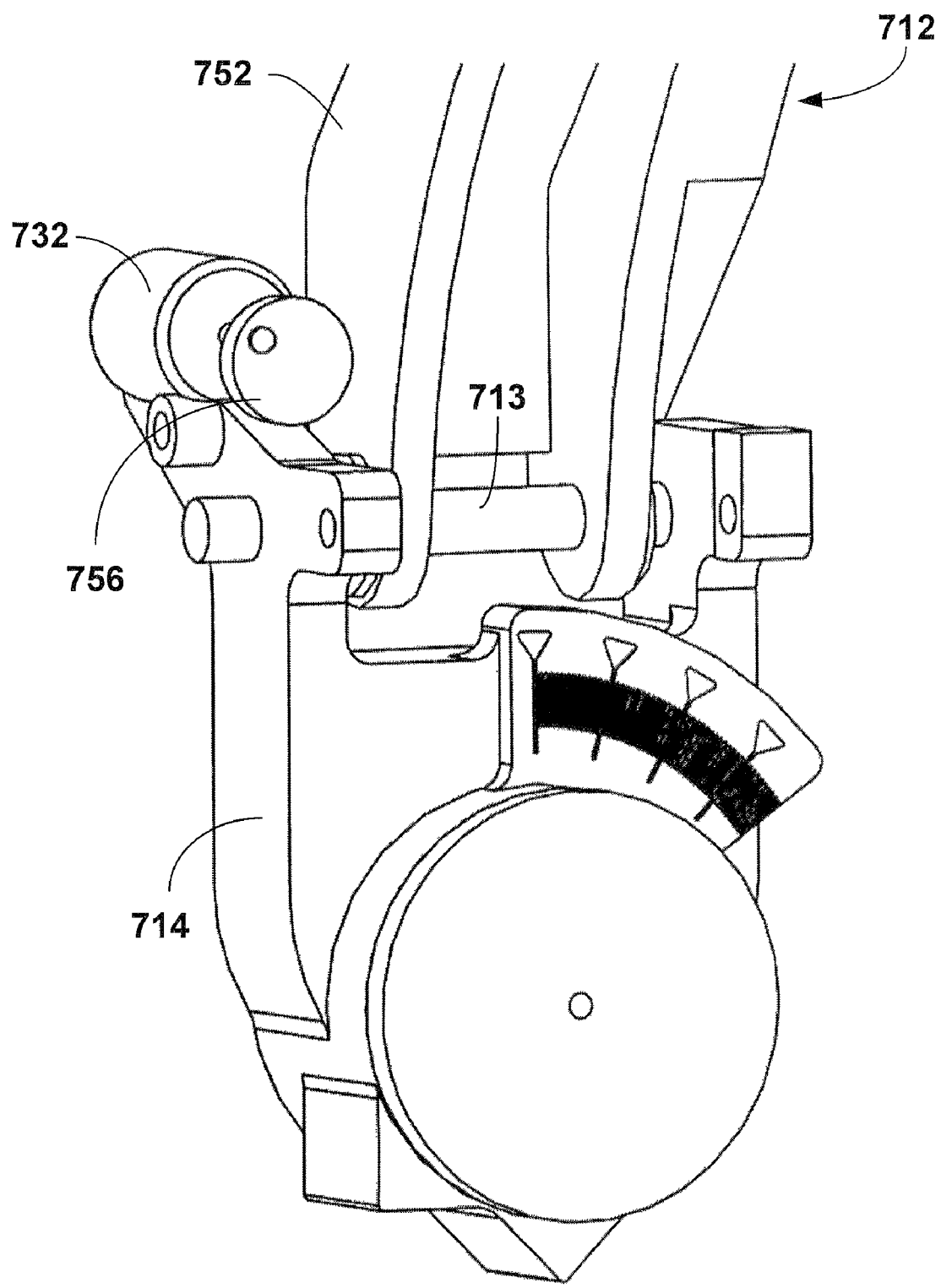
FIG. 7 is a perspective view of an example of an adjusting mechanism contemplated herein including a cam.

FIG. 7 illustrates another embodiment, wherein a cam 756 is driven by a motor 732. The motor 732 may be mounted to the interim housing 714 or base. The cam 756 may be affixed to the motor 732, such that as the motor 732 drives the cam 756, the cam 756 interacts with the saw head 712, for example, near the saw head arm 752. As the cam 756 pushes against the saw head 712, the saw head 712 may ride along the pivot pin 713. A spring may act upon the saw head arm 752 to maintain contact of the saw head arm with the cam surface, thereby axially constraining the saw head arm with the cam surface. The cam could also be configured as an eccentric circle, having an outside bearing surface which rotates, with its axis positioned such that it generally intersects the pivot shaft axis, allowing the cam surface to rotate freely as the saw arm is rotated around the pivot axis and lowered for cutting. It can be appreciated that this arrangement could be configured with the motor attached to the saw arm, whose cam surface acted on the housing (or interim housing).

Figure 8A:
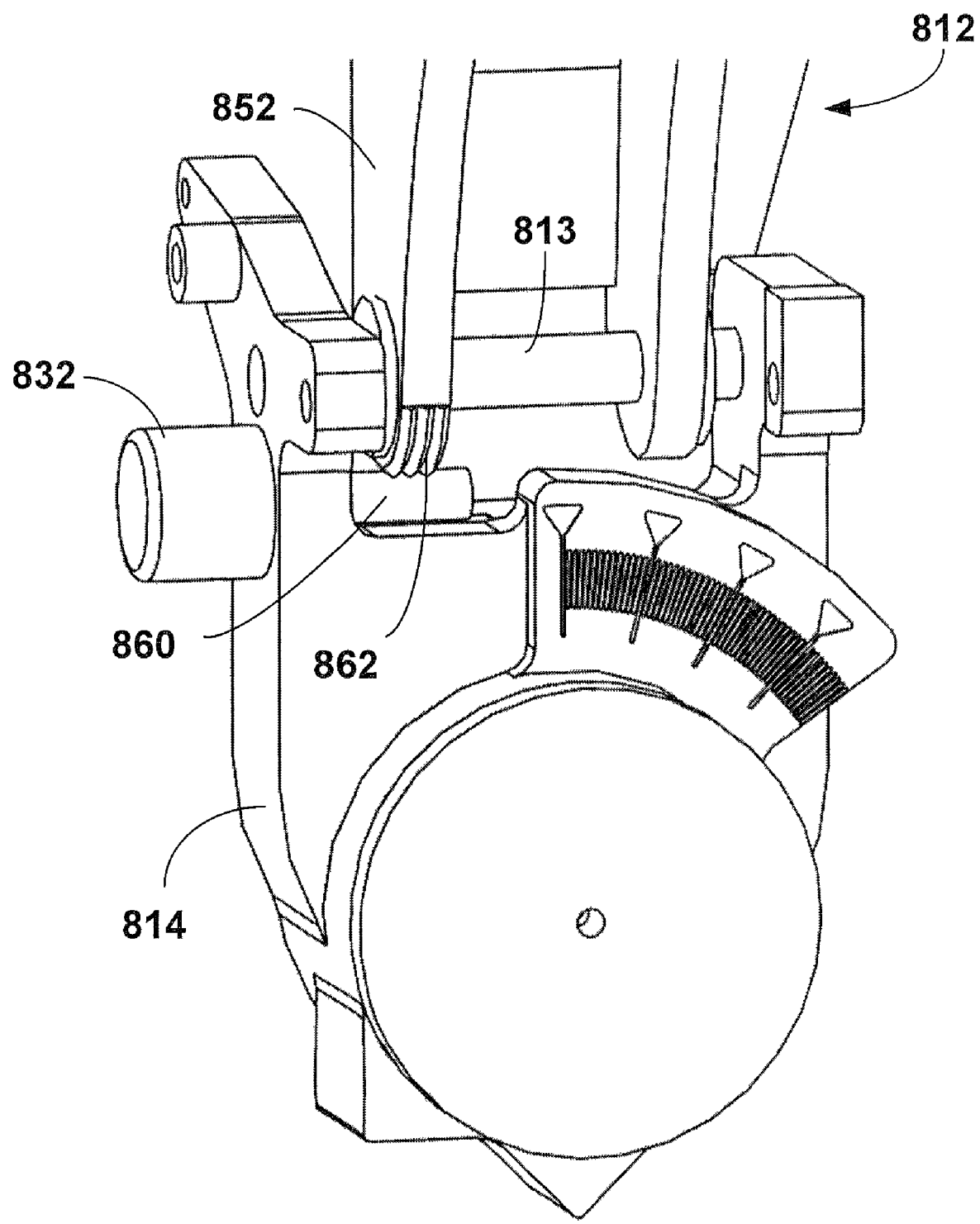
FIG. 8a is a perspective view of an example of an adjusting mechanism contemplated herein including a worm gear.
Figure 8B:
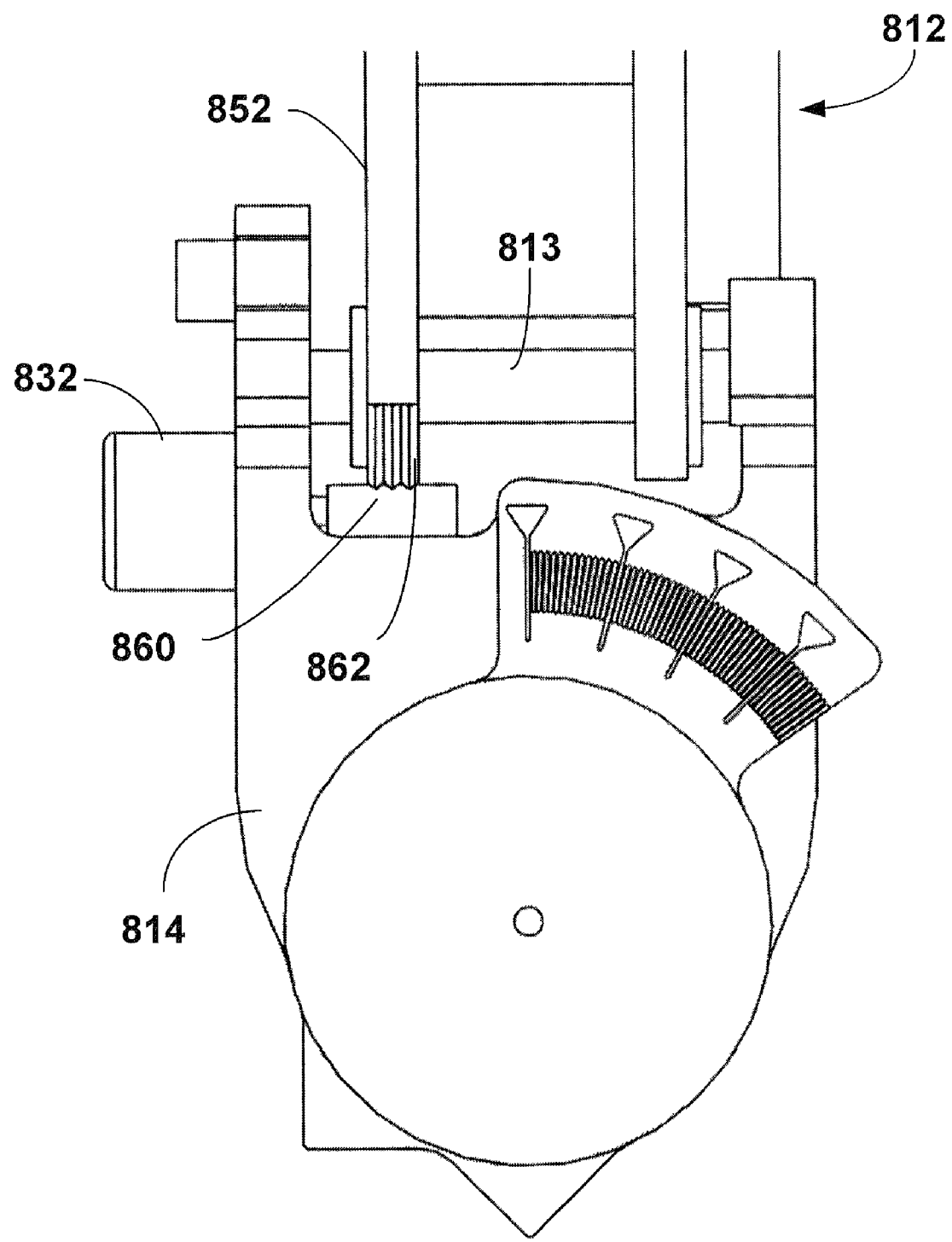

FIGS. 8a and 8b illustrate another embodiment wherein the motor 832 may be affixed to the interim housing 814 or base driving a worm gear 860. The worm gear 860 may engage an annular gear (teeth "extruded" around a radius) 862 which may be either part of, or attached to, the saw head arm 852. The pivot pin 813 may be fixed and the saw head 812 may rotate freely around the pivot pin 813 or the saw head 812 may be affixed to the pivot pin 813 and the pivot pin 813 may rotate within the interim housing 814 or base. It can be appreciated the worm/motor may be mounted at some angle to the annual gear to reflect its helix angle and provide proper engagement. One advantage of this configuration is that the saw arm is free to rotate without translating, because the annual gear slides through the engaged worm teeth.

Figure 9A:
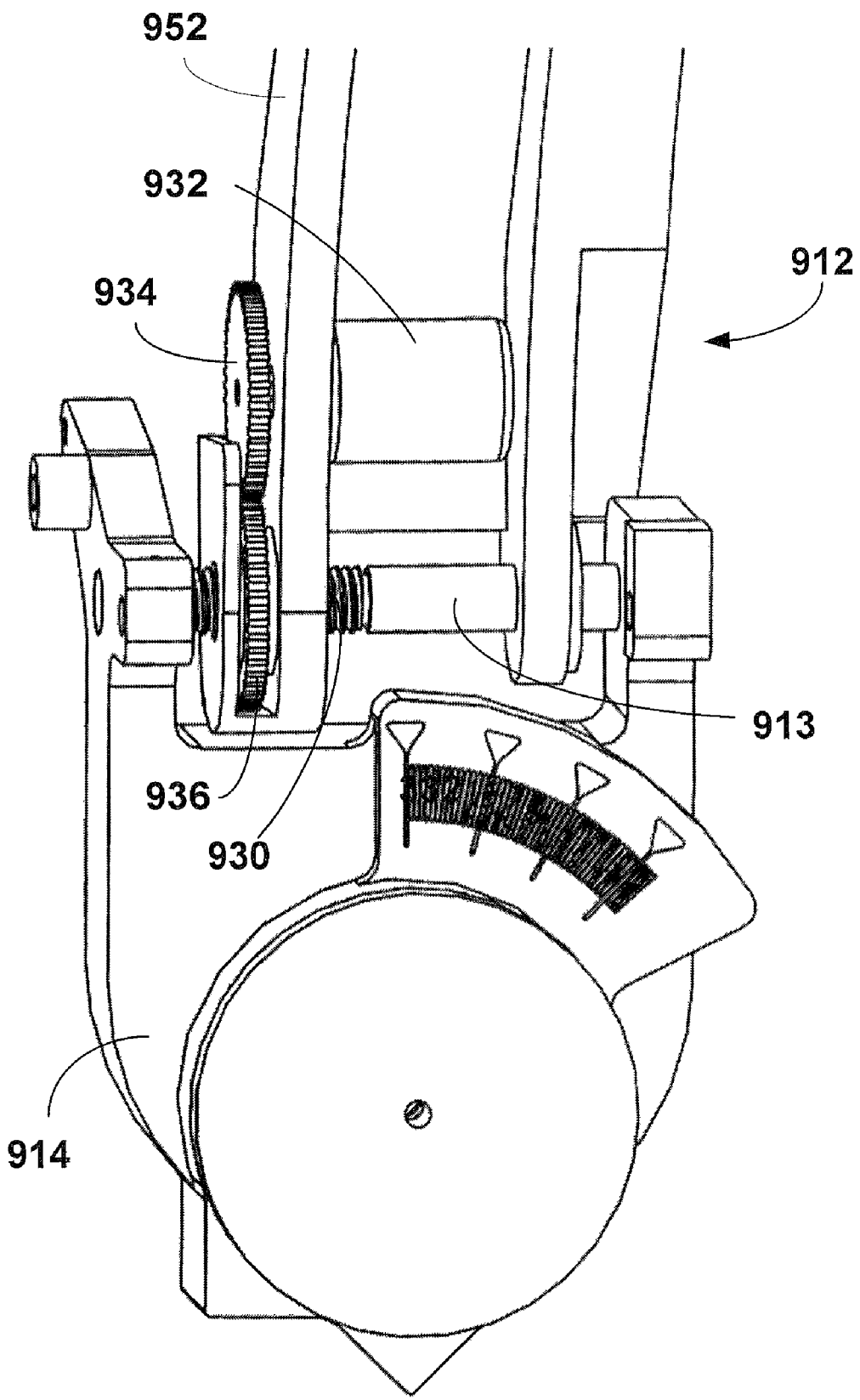
FIG. 9a is a perspective view of an example of an adjusting mechanism contemplated herein including a threaded pivot pin and a motor mounted on the saw head.
Figure 9D:
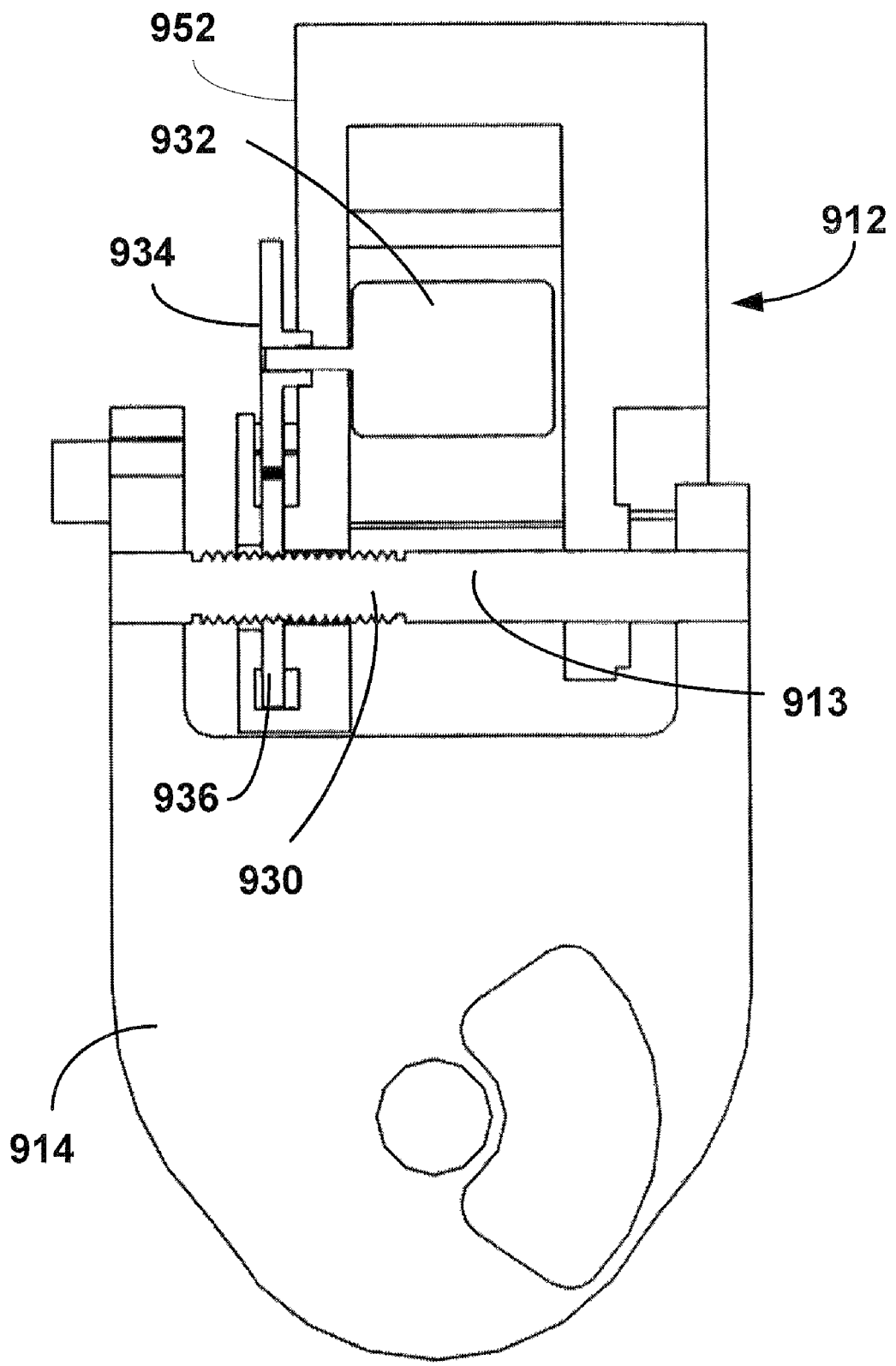
Figure 9E:
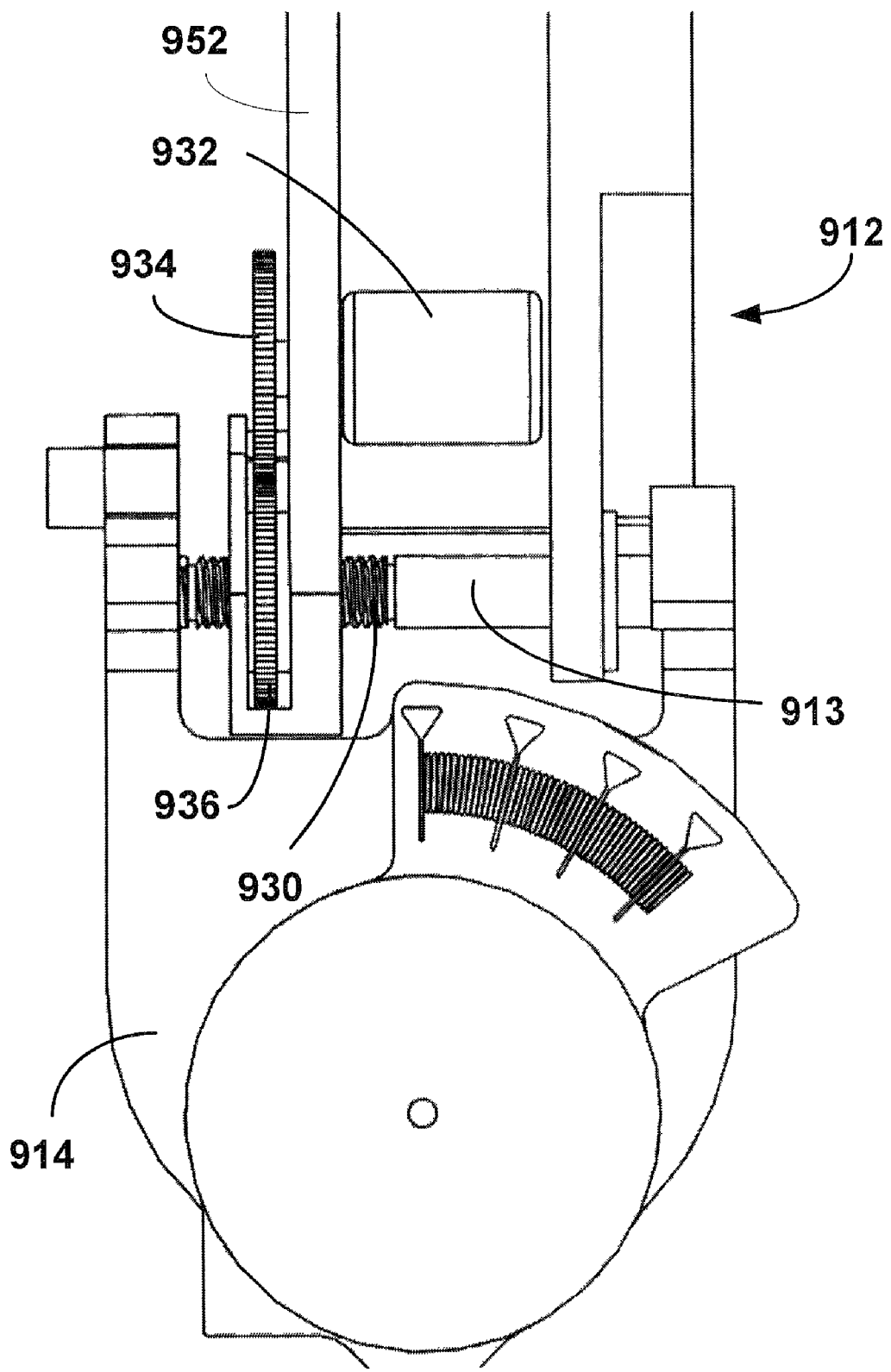

In addition to the above, FIGS. 9a, b, c, d, and e illustrate an embodiment wherein the motor 932 may be mounted to the saw head 912. The shaft of motor 932 may be pinned to a first gear 934, which may be axially constrained against the saw head arm 952. The first gear 934 may intermesh with a second gear 936, which may include a threaded internal diameter. The second gear 936 may also be axially constrained against the saw head arm 952. A pivot pin 913 may be axially constrained with respect to the interim housing 914 and rotationally constrained to the saw head arm through a key way or other feature. At least a portion of the pivot pin may include threads 930. The saw head arm 952 is capable of moving axially relative to the pivot pin 913. As the motor 932 turns the gears 934/936, the gears 934/936 may then rotate against the threaded portion 930 of the pivot pin 913, causing the saw head 912 to move axially along the pivot pin and chopping pivot axis.

Figure 10A:
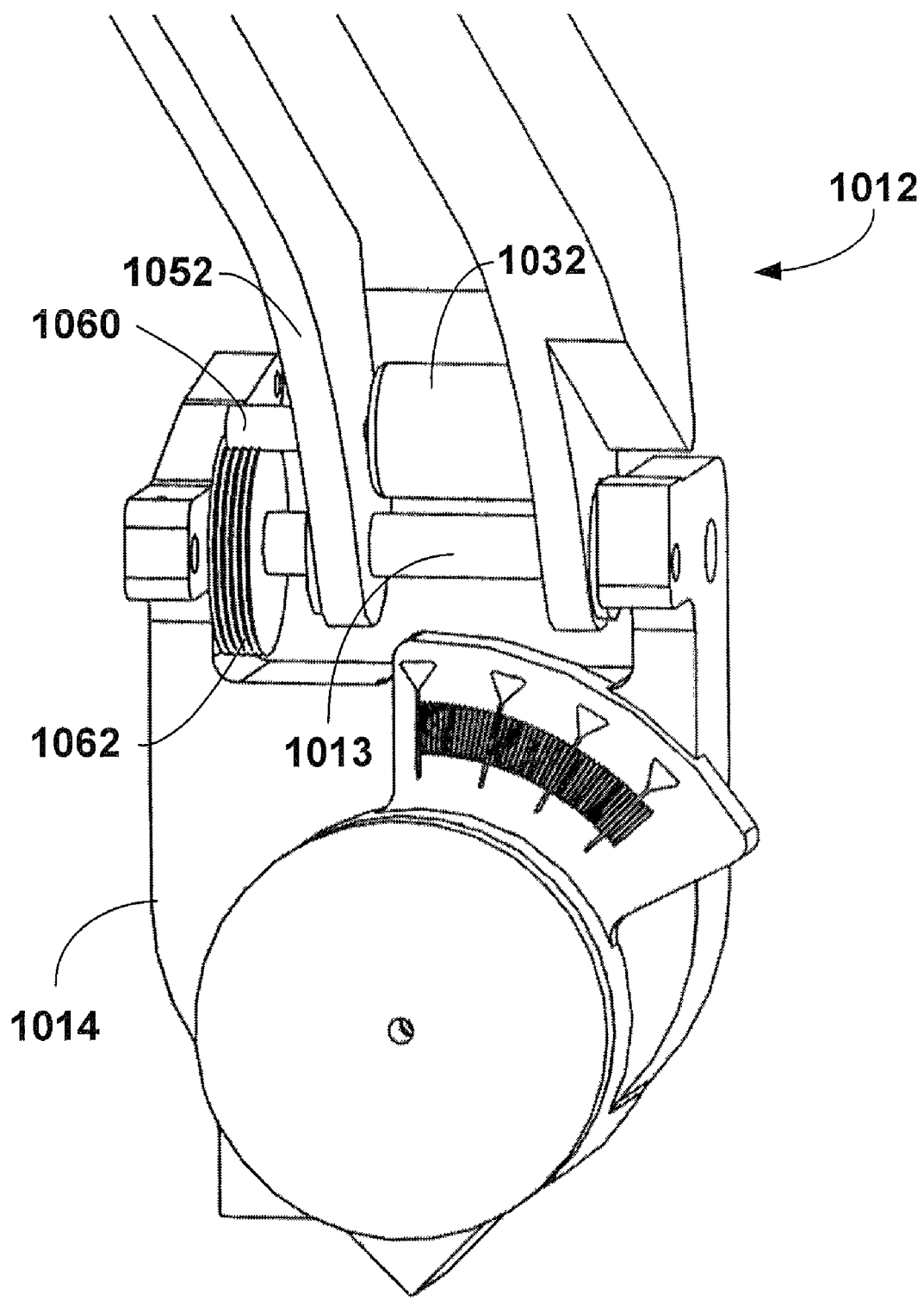
FIG. 10a is a perspective front view of an example of an adjusting mechanism contemplated herein.
Figure 10B:
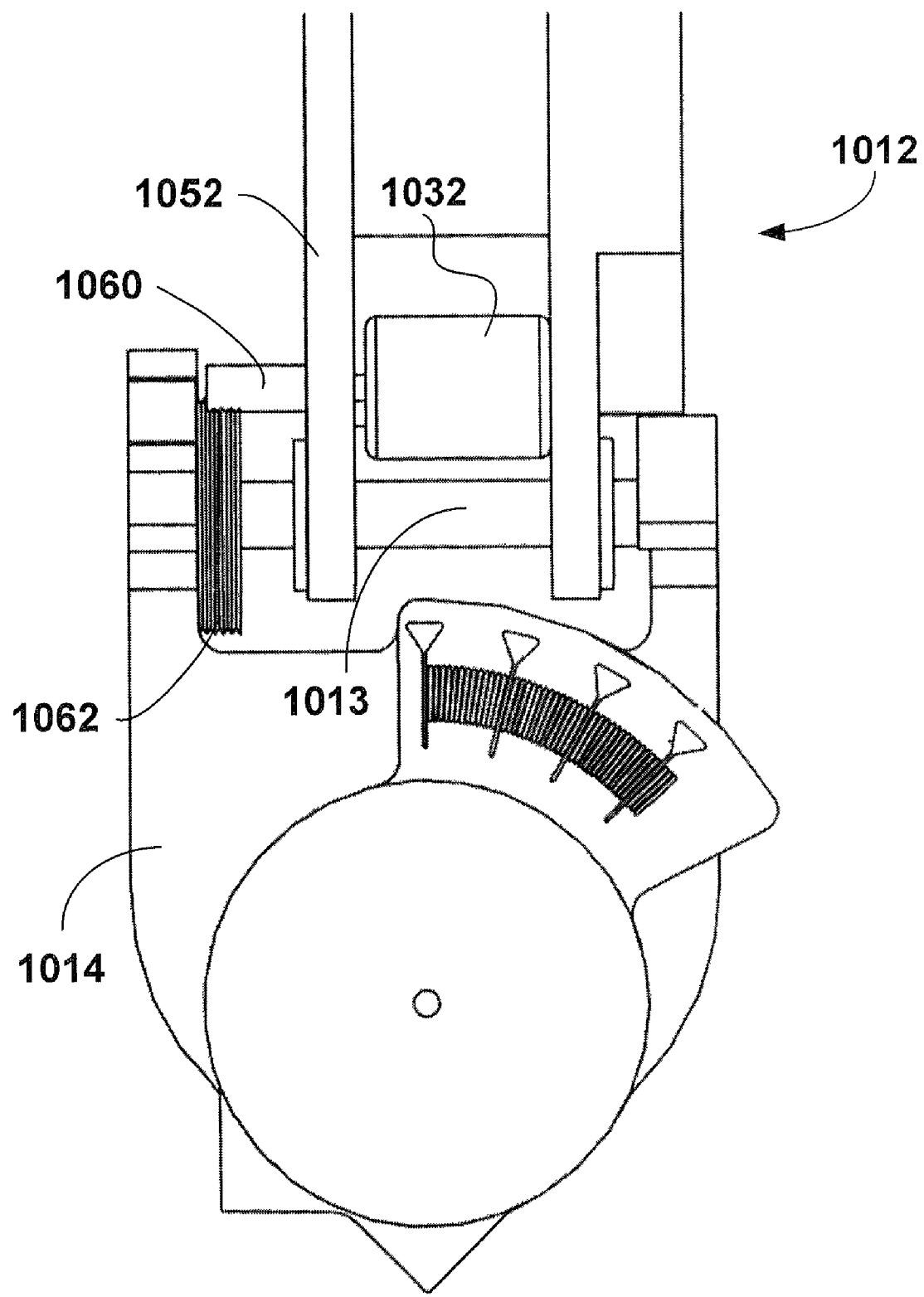

FIGS. 10a and b illustrate an embodiment, wherein the motor 1032 may be mounted on the saw head and its shaft pinned to an output worm gear 1060. The worm gear may engage a second annular gear 1062 integral to or attached to a fixed pivot pin 1013, wherein the pin 1013 may be axially and rotationally constrained to the interim housing 1014. The saw arm head 1052 is free to rotate axially and rotationally relative to the pivot pin 1013. As the motor 1032 turns the worm gear 1060, the worm gear interacts with the annular gear 1062, moving the saw head 1012 axially along the chopping pivot axis.

It may be appreciated that the worm gear 1060 and/or motor 1032 may be mounted at an angle to the annular gear, depending on the helix angle of the worm gear 1060. The saw arm 1012 may therefore be free to rotate as the annular gear may slide through the engaged worm teeth. In addition, the pivot pin 1013 may be free to rotate in the interim housing 1014 and the annular gear 1062 may instead be a single worm gear, effectively a half nut.

Figure 11A:
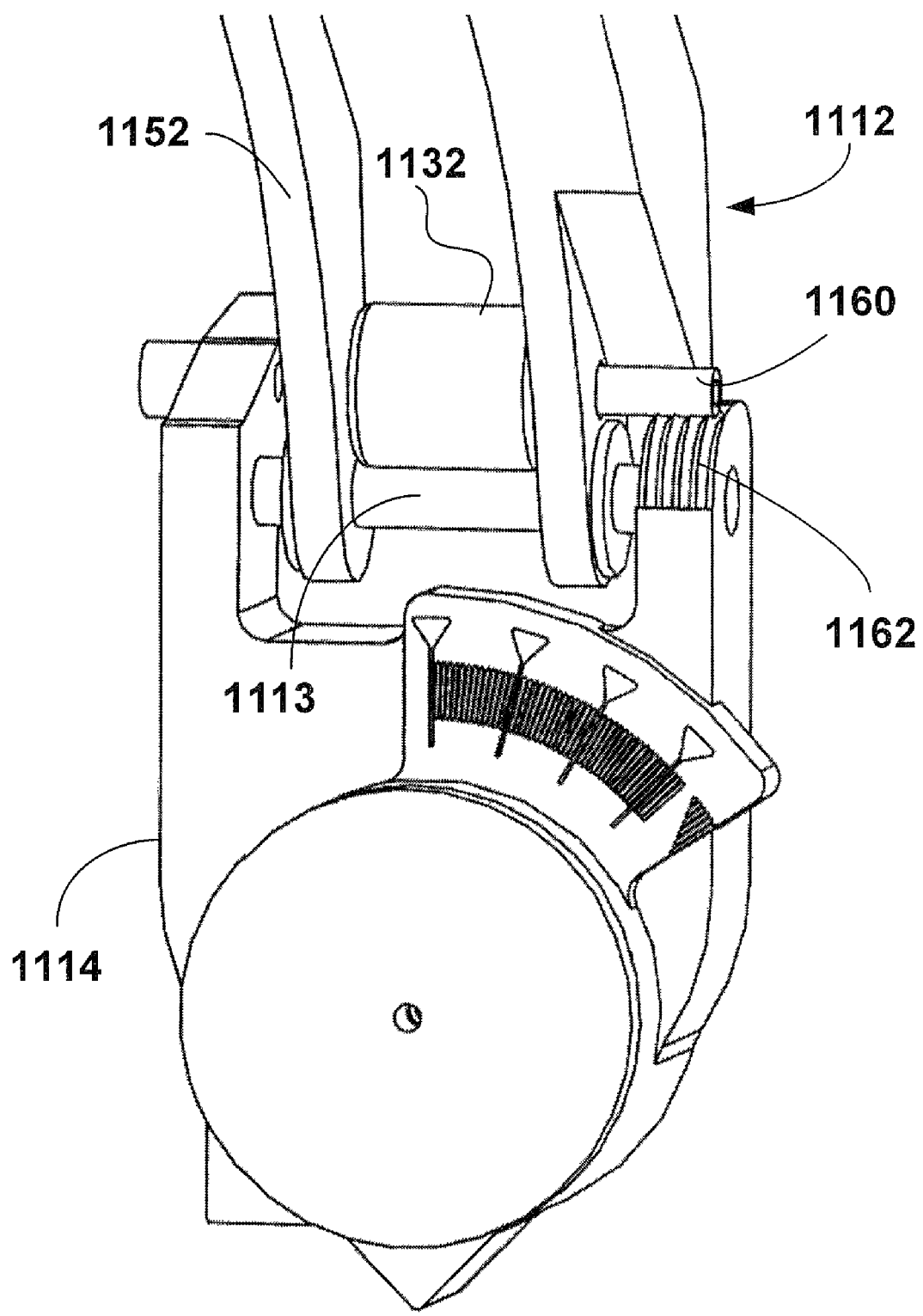
FIG. 11a is a perspective view of an example of an adjusting mechanism contemplated herein.
Figure 11B:
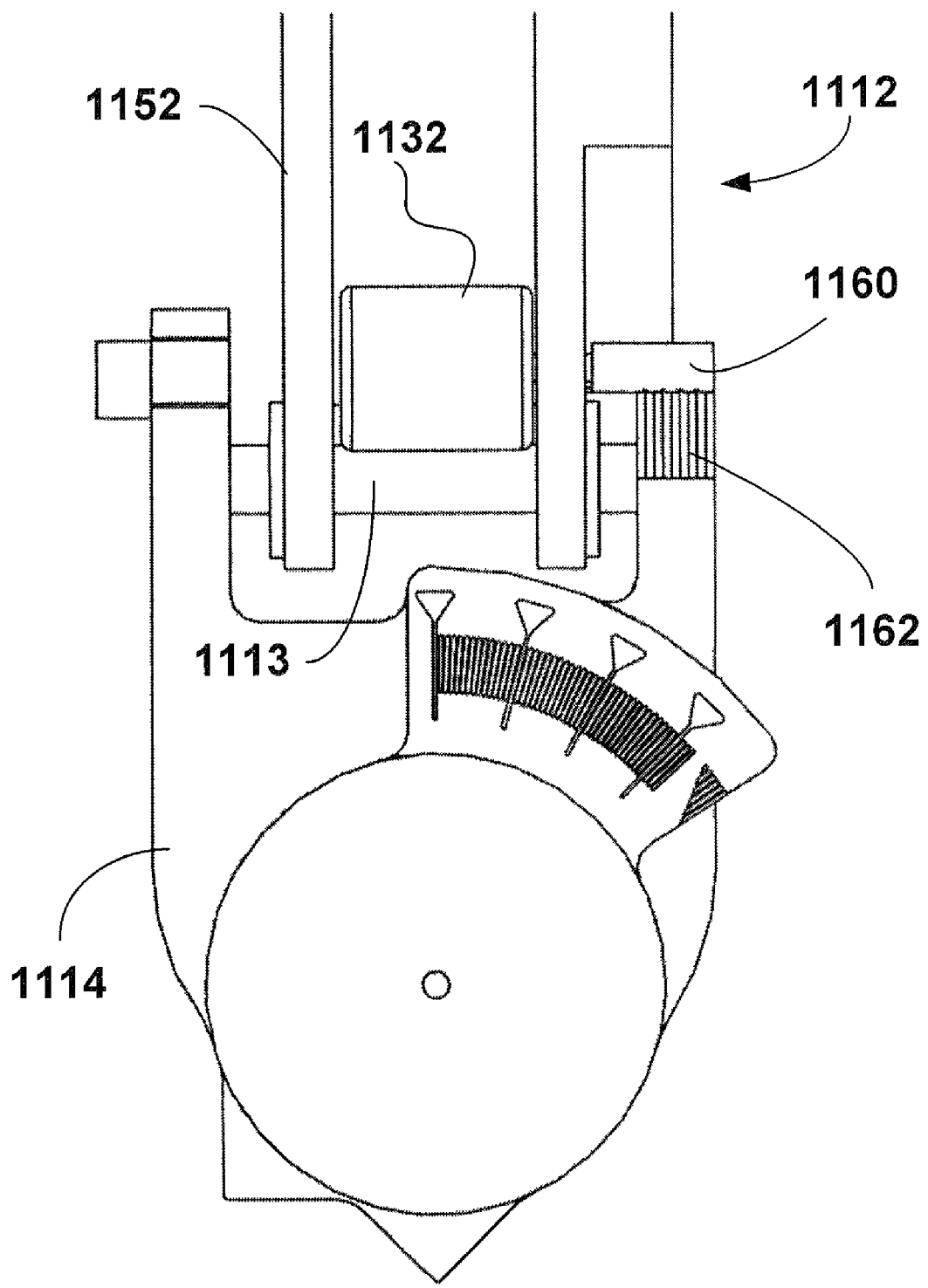

FIGS. 11a and b illustrate an embodiment wherein the motor 1132 may be mounted to the saw head 1112 and pinned to an output worm gear 1160. The worm gear 1160 may engage a second annular gear 1162 surface which may be attached to or integral with the interim housing 1114 or base. The saw head 1112 may ride freely along the pivot pin 1113, which may be axially and/or rotationally constrained in the interim housing 1114. In addition, the pivot pin 1113 may be rotationally constrained to the saw head 1112 and rotate within the interim housing 1114 upon actuation of the saw head 1112. As the motor worm 1160 is turned, the saw head 1112 may be translated along the axial chopping pivot axis.

It may once again be appreciated that the worm gear 1160 and/or motor 1132 may be mounted at an angle to the annular gear 1162, depending on the helix angle of the worm gear. Once again, the saw arm 1112 may be free to rotate without translating as the annular gear 1162 may slide through the engaged worm gear teeth 1160. In addition, the worm gear teeth may be a single enveloping worm gear, i.e., a half nut, if the mating teeth were formed in a separate piece that was axially constrained to the interim housing or base, but free to rotate around the pivot pin axis.

Figure 12A:
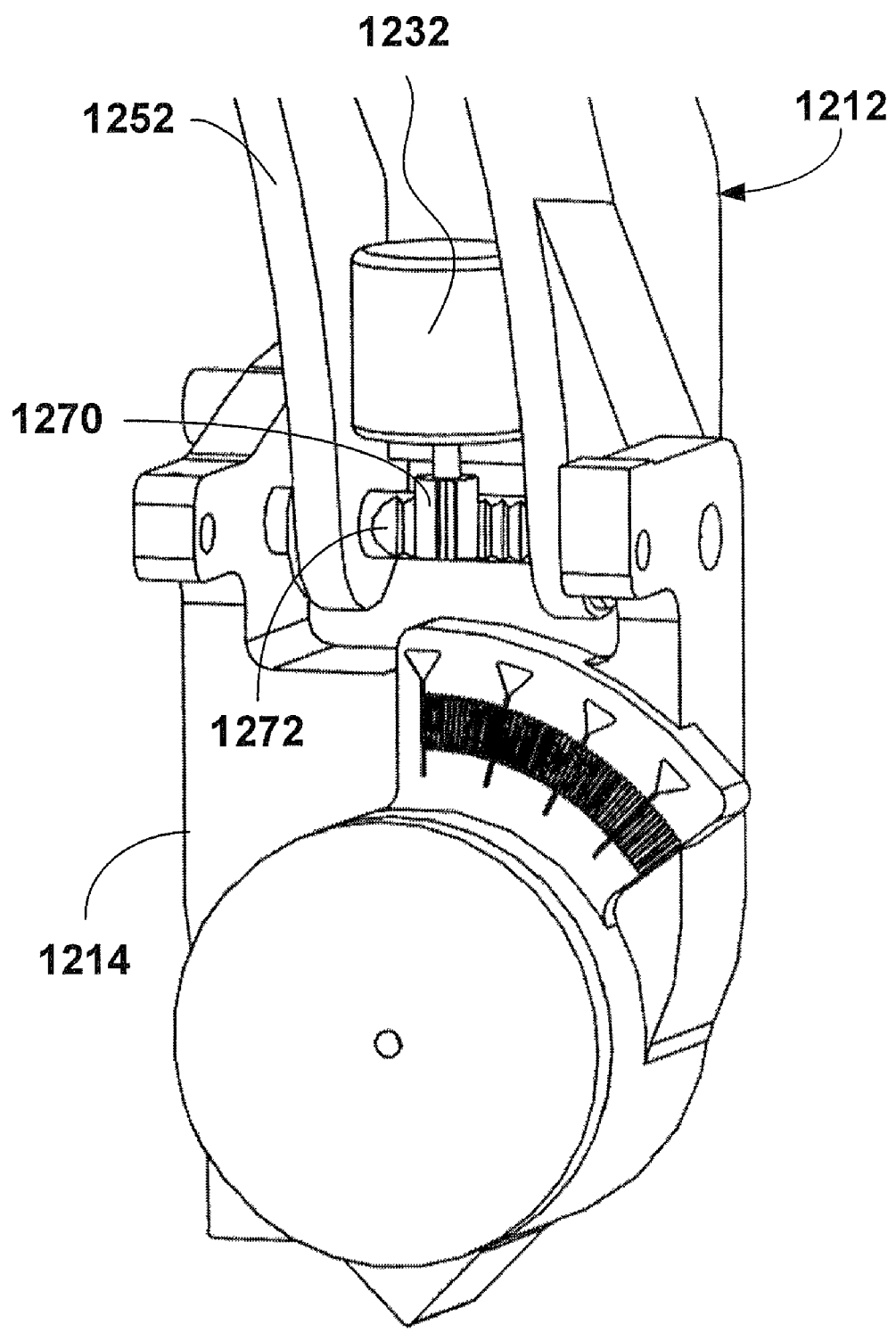
FIG. 12a is a perspective view an example of an adjusting mechanism contemplated herein including a rack and pinion.
Figure 12B:
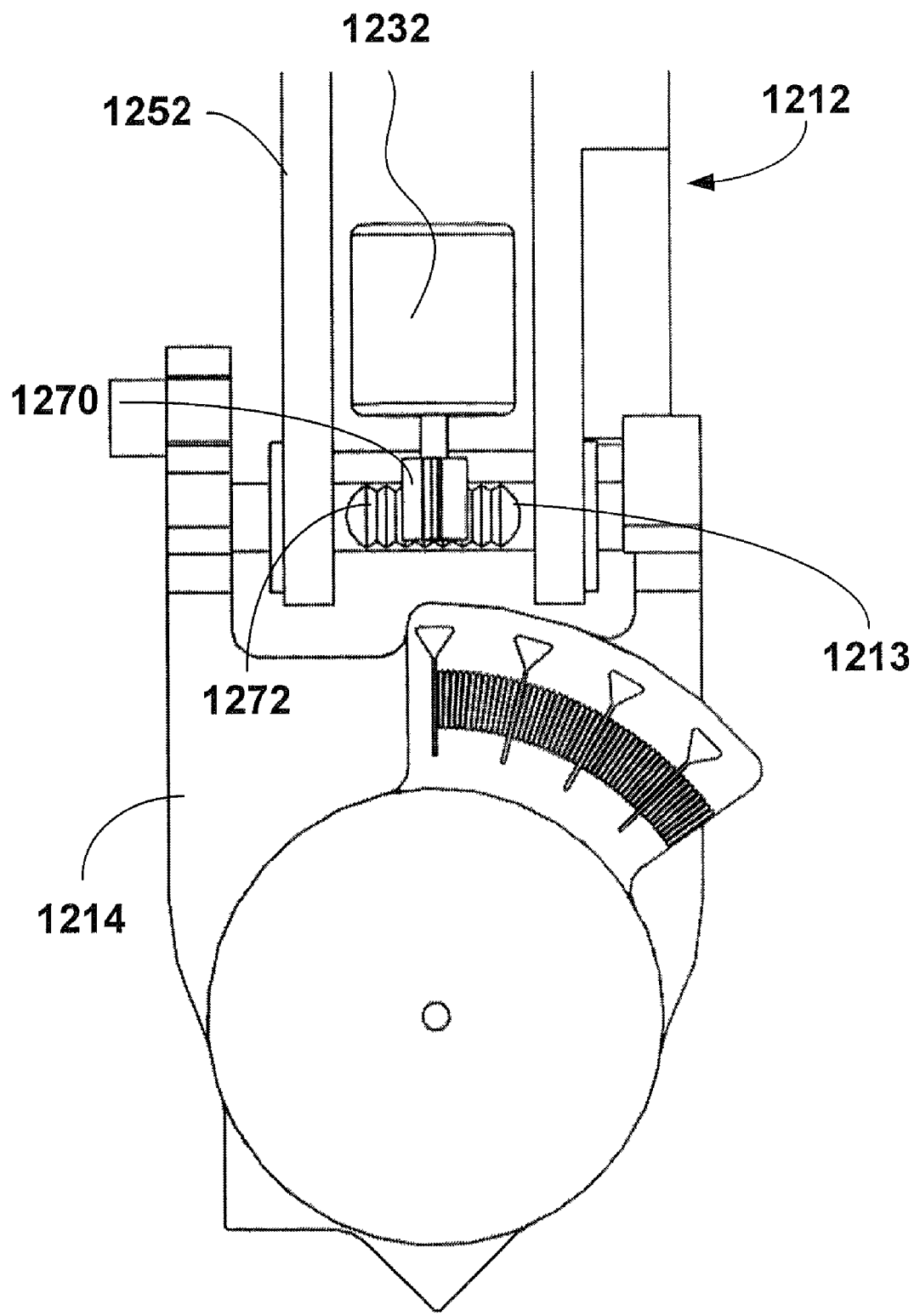

FIGS. 12a and b illustrate a pinion assembly for axially displacing the saw head. In such an embodiment, motor 1232 may be mounted to the saw head 1212 and pinned to an output pinion 1270. The pinion 1270 may engage a rack 1272 having teeth formed integral to or attached to the pivot pin 1213. The pivot pin 1213 may be axially and/or rotationally constrained with respect to the interim housing or base 1214. As the motor 1232 turns the pinion 1270 may rotate and interact with the rack 1272 causing the saw head 1212 to move axially through the chopping pivot axis.

In addition, where the pivot pin 1213 may be rotationally constrained in the interim housing 1214, the saw head 1212 may rotate about the pivot pin 1213. Where the pivot pin 1213 rotates within the interim housing 1214, the saw head 1212 may be constrained to the pivot pin 1213 and upon actuation, both saw head 1212 and pivot pin 1213 may rotate in unison.

Figure 13A:
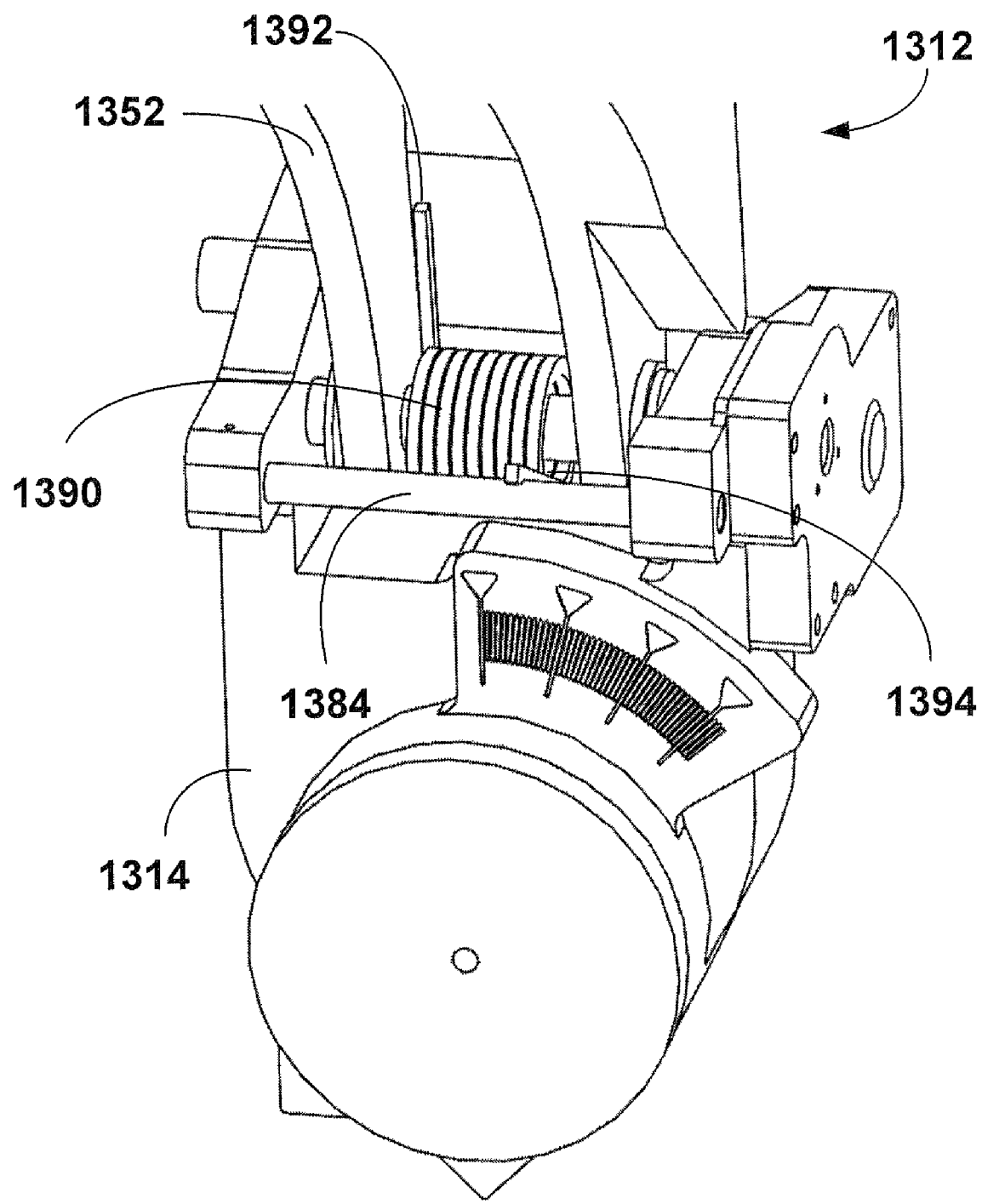
FIG. 13a is a perspective view of an example of an adjusting mechanism including a torsion spring.
Figure 13B:
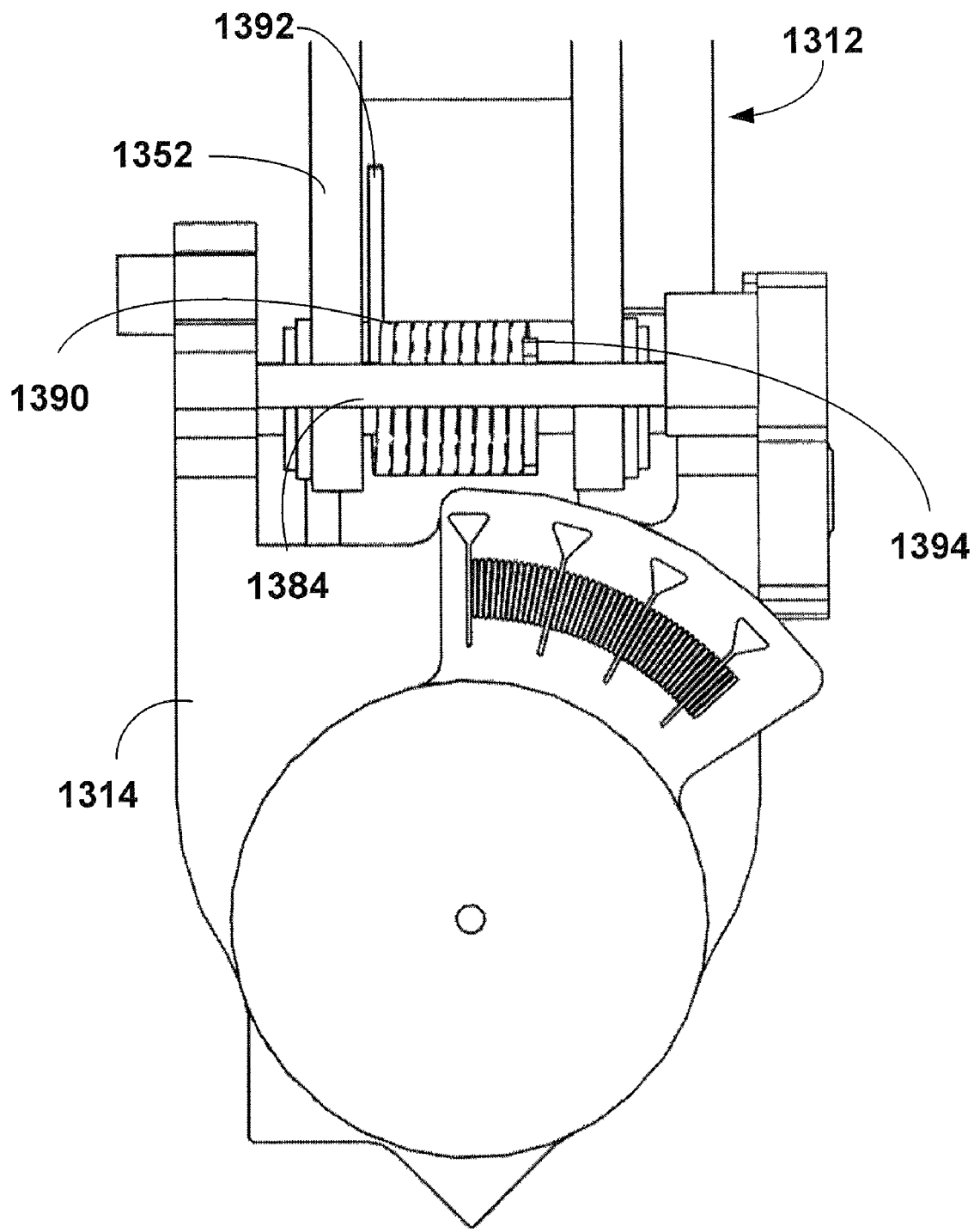

FIGS. 13a and b illustrate a sliding torsion spring as described herein. The torsion spring 1390 may be provided to return the saw head 1312 to its resting position around the pivot axis, i.e. the up position. Accordingly, the torsion spring 1390 may be capable of providing a sufficient force to return the saw head 1312 to its resting position after actuation, without the "help" of the saw's user. As illustrated, the torsion spring 1390 may provide force against both a saw head arm 1352 by spring leg 1392 and the interim housing or base 1314 by spring leg 1394.

In providing movement of the saw head axially with respect to the chopping pivot axis, it may be appreciated that the torsion spring may be capable of accommodating for such travel. Accordingly, the torsion spring 1390 may slide along the interim housing or base 1314 and remain axially constrained with respect to a saw head arm 1352. In addition, and as illustrated in FIGS. 13a and b, a rod 1384 may be provided to facilitate the movement of the spring 1390, against which a portion of the spring 1390 may slide against. Furthermore, the rod may be provided with lubricant or may be formed from self lubricating material. The rod may also be hardened to prevent frictional wear to the arm. The rod may be any shape, such as cylindrical or angular.

Figure 14A:
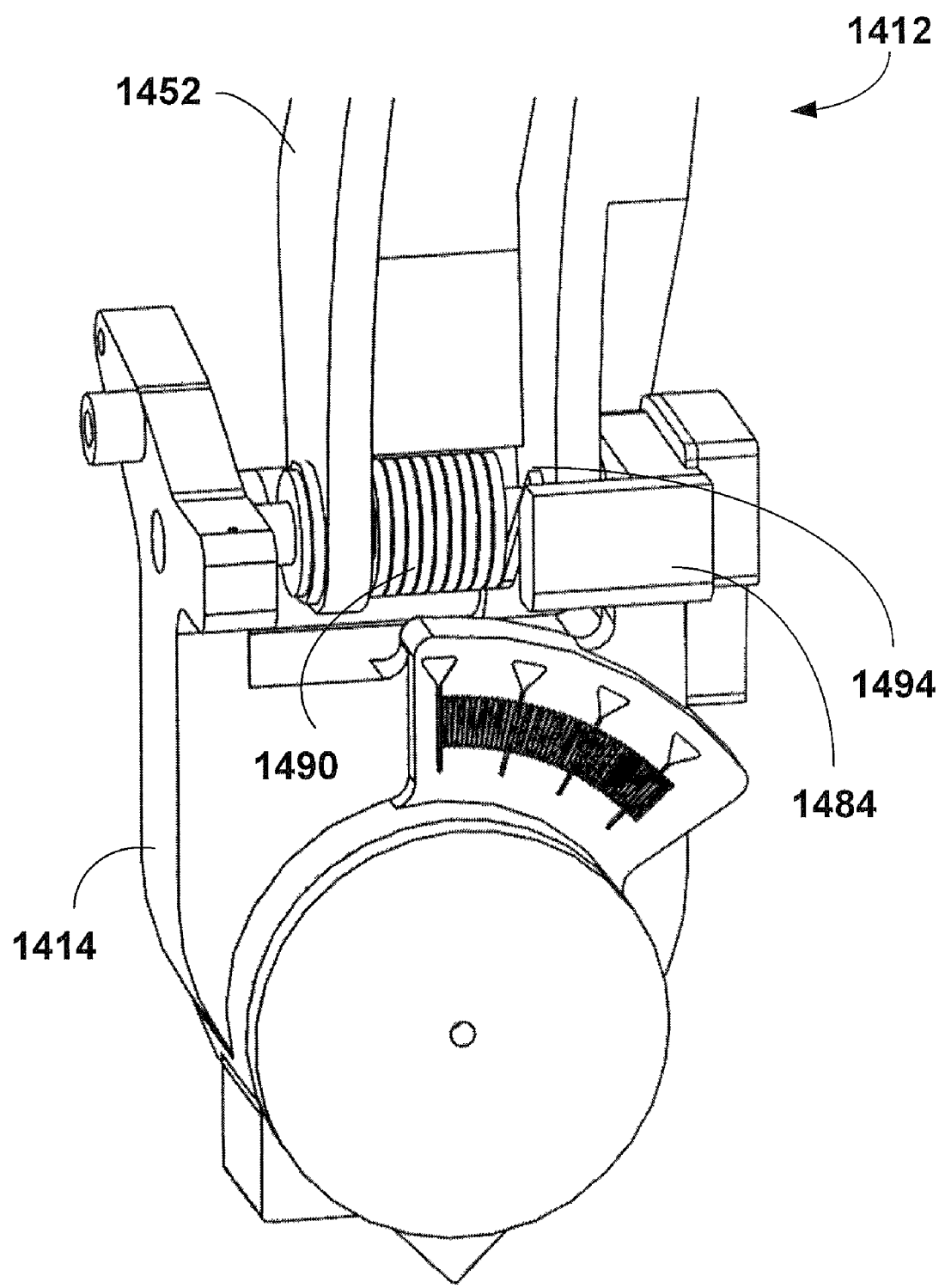
FIG. 14a is a perspective view of an example of an adjusting mechanism including a torsion spring.
Figure 14B:
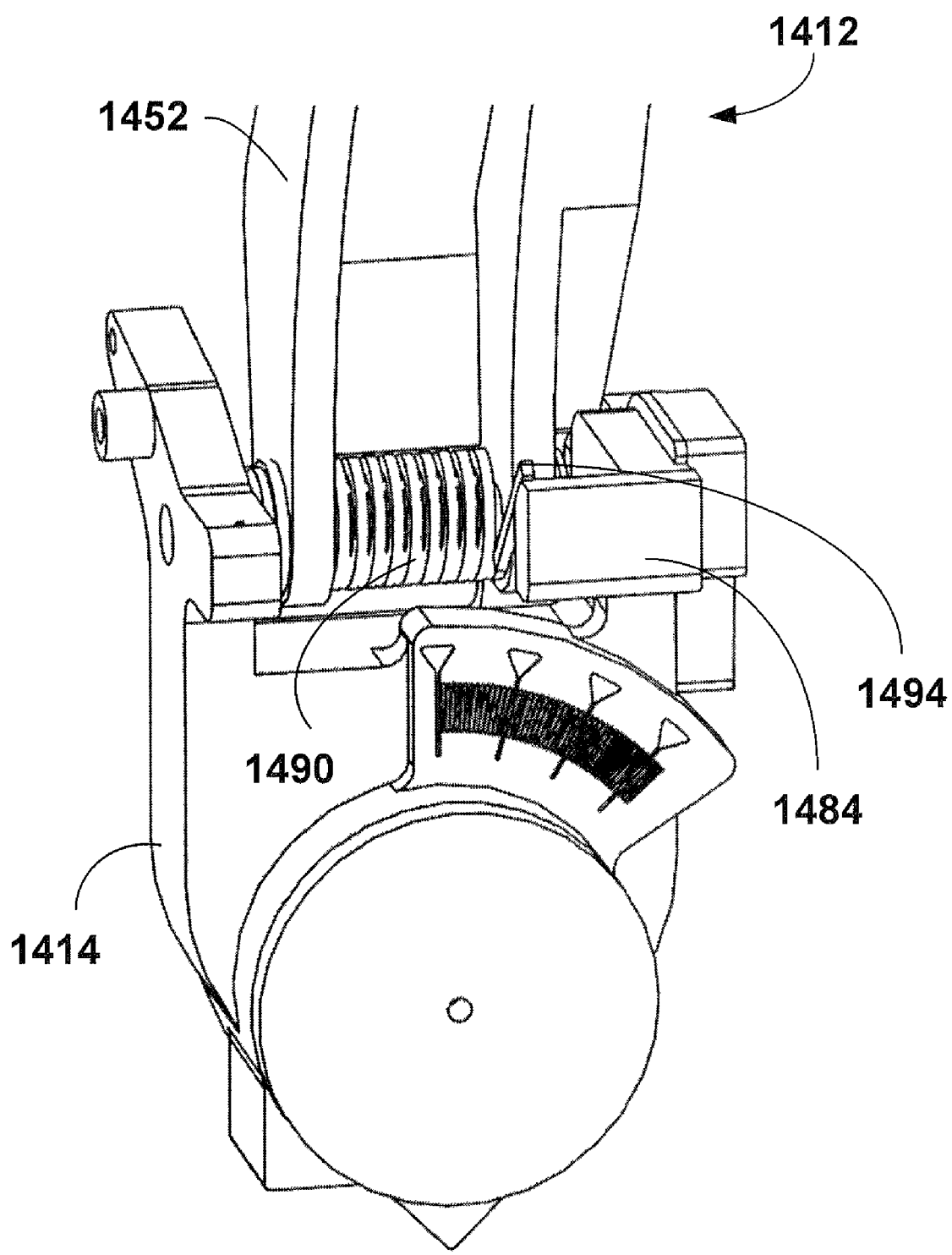
FIG. 14b is a further view of the mechanism of FIG. 14a with the torsion spring in an extended position.

FIGS. 14a and b illustrate another embodiment of a torsion spring, wherein in the spring has the ability to expand and compress axially. Accordingly, as the saw head 1412 travels back and forth along the chopping pivot axis, the spring 1490 may expand and/or contract. The torsion spring may be wound in such a way that the coils are not against one another, but have some space to be compressed. In this fashion, the translation of the saw can be accommodated by the spring—in one direction compressing it and in the other, expanding it. It can be appreciated that the spring could be wound with the coils tight against one another, but in the middle of the saw head/arm's travel, it would be under some level of stress, being extended from its resting position.

The torsion spring can be of a geometry such that the cross section of the coils is not circular or square, but where the dimension along the radius from the center of the spring is greater than the axial distance. In this way, the spring can be more compliant in compression or extension, but very stiff/strong in torsion. This is advantageous, because the translation motor can be put under as little load as possible.

As noted above, the torsion spring may be used alone or in conjunction with another spring to provide a counter force to the saw arm head. The counter spring may be utilized to push the saw arm head back to a home position after being displaced by a cam or other lever mechanism. Such spring may be placed between the interim housing or base and the saw head. In addition, the spring may be place around the pivot pin.

Figure 15:
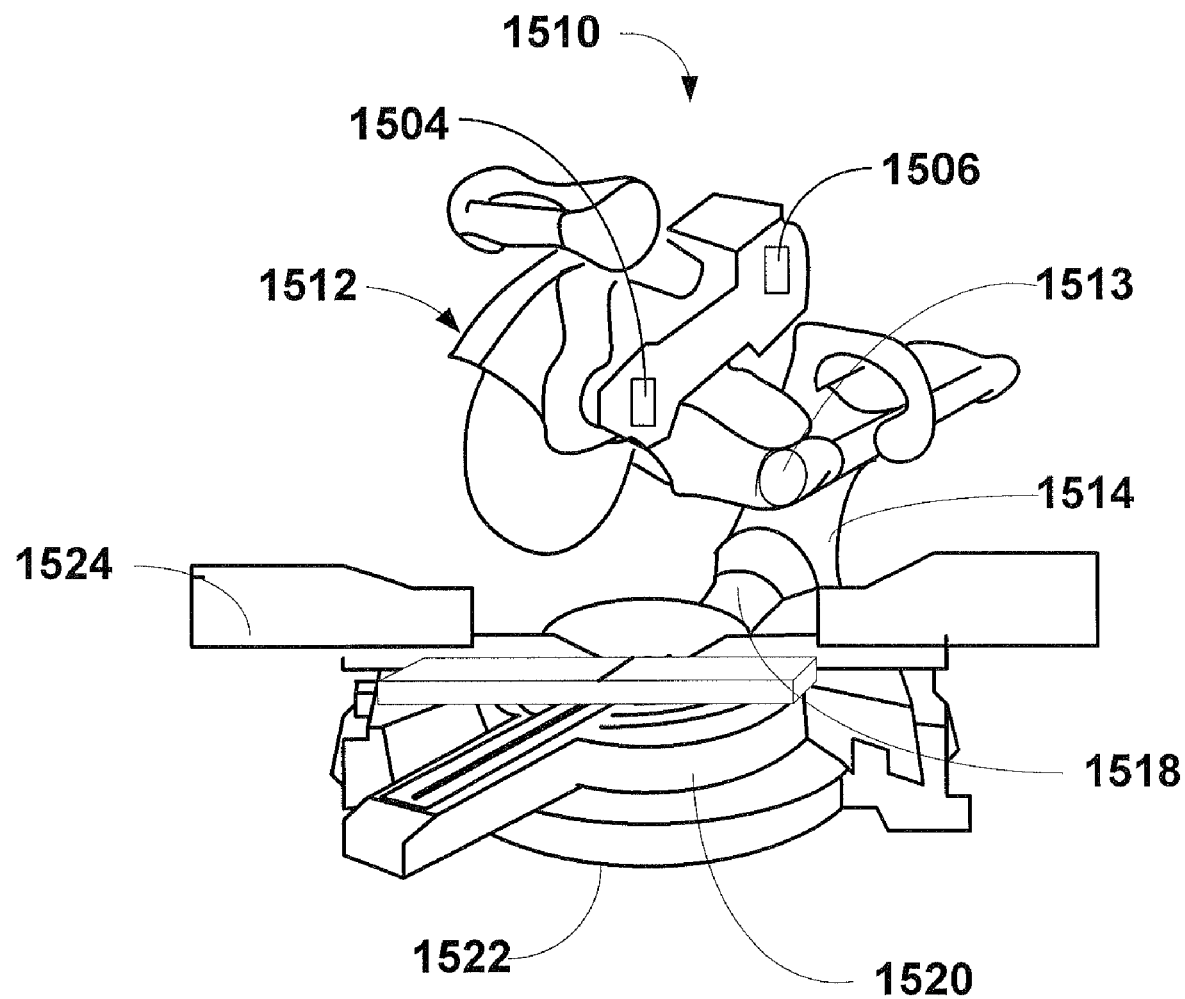
FIG. 15 is an illustration of an example of a chop saw contemplated herein, including a camera and a processor.

It is also contemplated herein that, in addition to the above, an automated positioning mechanism for the saw head may be provided. As illustrated in FIG. 15, the positioning mechanism may include a camera 1504, mounted upon the saw head 1512, interim housing or base. The camera may first be calibrated with the saw head to identify the distance that the saw itself may be relative to other points. The camera may capture an image of the work piece and store the image in memory 1504. A processor 1506 may then process the image to find a line of contrast (e.g. a line drawn by a user on a workpiece). The processor may then estimate the position and width of the line relative to the saw and then move the saw axially, when the saw is called upon for cutting, using the various motorized embodiments of the positioning mechanism described above. The system may also be set to cut to the left, center or right of the line using either side of the saw blade, which may accommodate for the various conditions under which the mark was drawn on the work piece.

Figure 16:
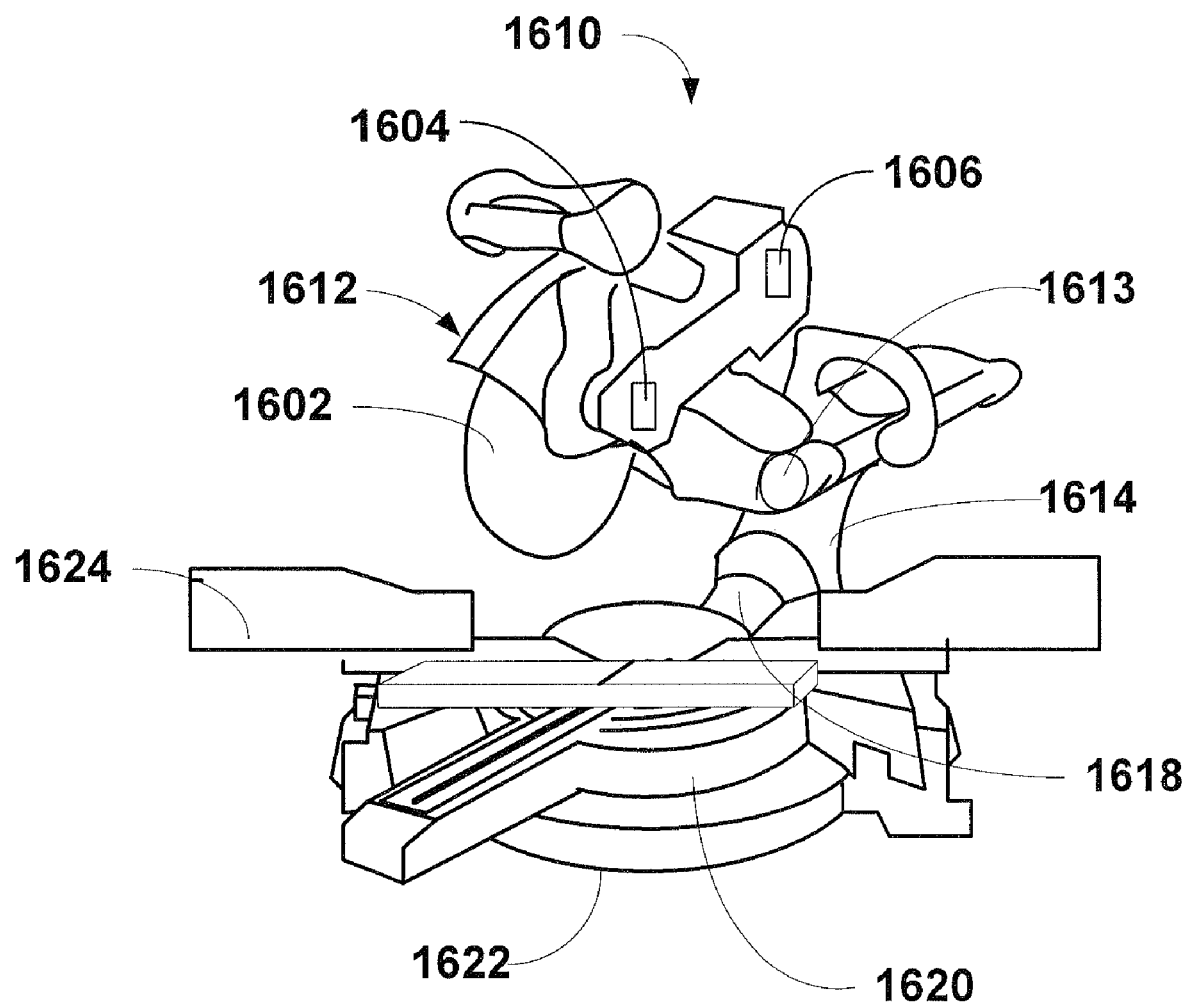
FIG. 16 is an illustration of an example of a chop saw contemplated herein, including a laser, optical detector and processor.

In addition, illustrated in FIG. 16, the positioning mechanism may include a sensor 1604 including a laser and optical detector. The laser light may be modulated at various rates. The saw head 1612 may be moved across the potential cutting area along the chopping pivot axis. The light reflected may be observed by an optical detector. The optical detector may be narrow band filtered. From the detected light, signals an image may be discerned by a processor 1606 from which an appropriate cut location may be determined.

Figure 17B:
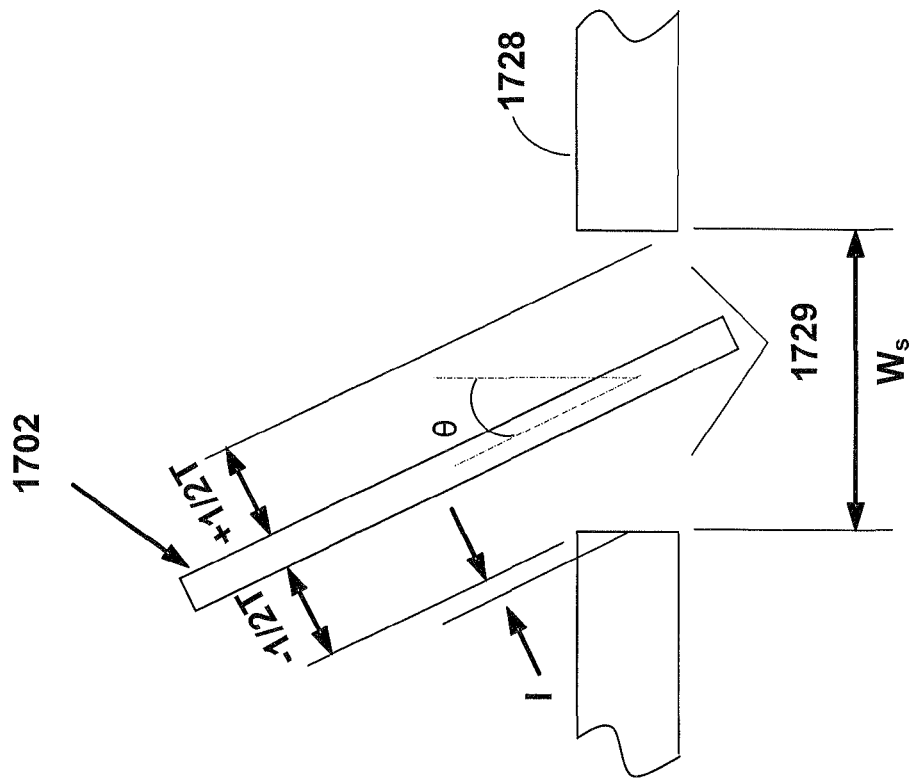
FIG. 17b is an illustration of a saw blade at an angle in relation to the horizontal surface, having an opening defined therein.
Figure 17A:
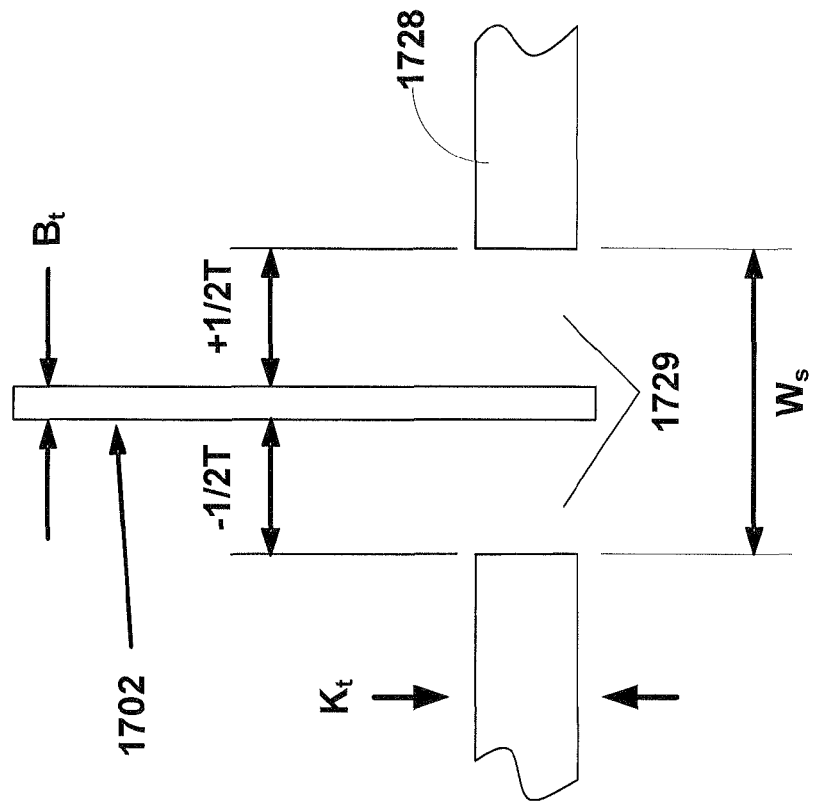
FIG. 17a is an illustration of a saw blade in relation a horizontal surface, having an opening defined therein.

In light of the above, also provided herein is a method and system for determining the total available travel distance of the saw blade in the saw head relative to the turntable opening or kerf plate. FIGS. 17a and 17b illustrate the change in travel distance between a saw blade positioned perpendicular or 90° to the table surface (FIG. 17a) and a saw blade positioned at an angle θ to the table surface (FIG. 17b). As seen in FIG. 2, a saw may include a turn table. In the turntable 220 may be located an opening 226. A kerf plate 228 may fit over or within the opening having a slot 229 therethrough for the passage of the saw blade 202.

Referring back to FIG. 17a, a blade 1702 may have a total travel distance ($T_{td}$) which may be the width of the kerf plate slot 1729 ($W_s$) minus the blade 1702 thickness ($B_t$), thus $T_{td} = W_s - B_t$. However, as the blade begins to angle, as illustrated in FIG. 17b, it may be evident that due to potential interference I between the blade 1702 and the kerf plate 1728, the total travel distance ($T_{td\,\theta}$) may be reduced. Assuming the saw blade's bevel angle axis is centered in the middle of the kerf plate, the new total travel distance may therefore be calculated by multiplying the cosine of the angle of the blade with the kerf slot width. From this number the blade width and kerf interference times two may be subtracted. The new total travel distance may be represented by the following formula:

$$T_{td\,\theta} = (\cos\theta) * W_s - B_t - 2*I$$

The kerf blade interference I may be determined by the following formula:

$$I = \sin\theta * K_t$$

wherein $K_t$ is the kerf plate thickness.

Accordingly, a processor may be provided with a signal representing the blade angle, such as a signal provided by a transducer, for example, the processor may be able to determine the $T_{td\,\theta}$ and thereby limit the total distance the saw head is positioned with respect to the kerf plate. The processor may be capable of performing the calculation or the processor may be provided with a look up table, such as the one below for a number of blade widths, kerf sizes, etc. Table 1, below, illustrates an example of a look up table for a blade having a width of 0.125, a kerf plate having a thickness of 0.150 and a kerf slot weight of 0.625.

TABLE 1

Total Travel Distance Look Up Table

| Blade Bevel Angle | COS θ | Kerf Interference | Total Travel | ½ Travel |
|---|---|---|---|---|
| 0 Saw Upright | 1.000 | 0.000 | 0.500 | 0.250 |
| 11.250 | 0.981 | 0.029 | 0.459 | 0.229 |
| 22.500 | 0.924 | 0.057 | 0.395 | 0.198 |
| 33.750 | 0.831 | 0.083 | 0.311 | 0.156 |
| 45.00 | 0.707 | 0.106 | 0.211 | 0.105 |

Referring to FIGS. 17a and b, Travel ½ T, may be understood as the distance between the blade surface/teeth and the edge of the kerf slot when the blade is centered within the kerf slot. If the axis of rotation for the bevel angle is at a location other than the center of the kerf slot, the above formula can be modified to adjust the safe travel accordingly.

Figure 18:
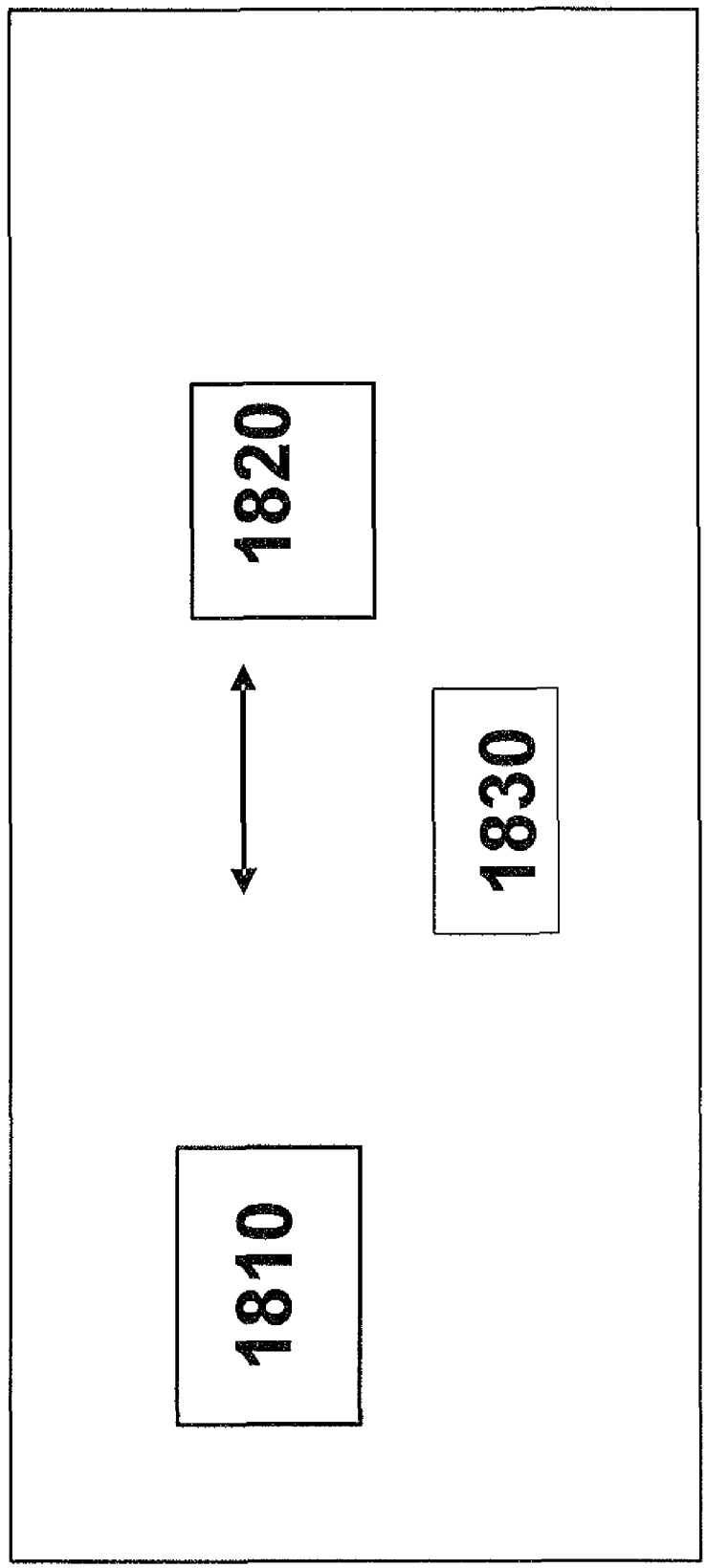
FIG. 18 an illustration of an embodiment of the present invention relating to an article of machine readable media in relation to a processor and a user interface.

It should also be appreciated that the functionality described herein for the embodiments of the present invention may be implemented by using hardware, software, or a combination of hardware and software, either within or outside of the saw, as desired. If implemented by software, a processor and a machine readable medium are required. The processor may be of any type of processor capable of providing the speed and functionality required by the embodiments of the invention. Machine-readable memory includes any media capable of storing instructions adapted to be executed by a processor. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on medium in either a compressed and/or encrypted format. Accordingly, in the broad context of the present invention, and with attention to FIG. 18, the saw may contain a processor (1810) and a machine readable media (1820) and user interface (1830).

It may also be appreciated that the above arrangements demonstrate a number of means to provide movement of the saw head along the axial axis. A person of ordinary skill in the art would understand that a number of the elements described with respect to the various embodiments herein may be interchangeable with other elements and other embodiments. Accordingly, the foregoing description is provided to illustrate and explain the present invention. However, the description hereinabove should not be considered to limit the scope of the invention set forth herein.

What is claimed is:

1. A saw comprising:
   a base portion including a horizontal plane configured to support a workpiece; and
   a sawhead including a blade pivotably connected to said base, wherein said pivotable connection of said sawhead to said base defines a chopping pivot axis therethrough, and wherein said sawhead is rotatable around said chopping pivot axis towards the workpiece and said sawhead is displaceable back and forth along said chopping pivot axis and parallel to the rotational axis at the center of the saw blade, wherein said lateral displacement is enabled by said pivotable connection.

2. The saw of claim 1 wherein said pivotable connection comprises a pivot pin in a housing.

3. The saw of claim 2 wherein at least a portion of said pin includes threads.

4. The saw of claim 3 wherein said threads engage a gear wherein said gear is driven.

5. The saw of claim 3 where said saw head include one or more arms including a threaded bore engaged to said threads of said pin.

6. The saw of claim 3 where said sawhead includes one or more arms affixed to a nut including threads wherein said threads engage with said pin.

7. The saw of claim 2 wherein said pin is engaged to a cam and is displaceable along said chopping pivot axis by said cam.

8. The saw of claim 2 wherein said pin includes teeth including a drive pinion configured to engaged to said teeth to displace said sawhead along said chopping pivot axis.

9. The saw of claim 1, wherein said saw further comprises a second pivotable connection between said housing and said base, wherein said second pivotable connection is configured to angle said sawhead relative to the horizontal plane of the table to provide bevel cuts.

10. The saw of claim 1 further comprising a cam configured to displace said sawhead along said chopping pivot axis.

11. The saw of claim 1 which includes a motor with a worm that engages annular gear teeth that are concentric with the pivot axis and causes displacement along said chopping pivot axis.

12. The saw of claim 1 further comprising a positioning mechanism including a camera and a processor wherein said processor is configured to position the sawhead along said chopping pivot axis.

13. The saw of claim 1 further comprising a positioning mechanism including a laser and a processor wherein said processor is configured to position said sawhead along said chopping pivot axis.

14. The saw of claim 1 comprising a processor and wherein said base includes an opening for said blade wherein said processor is capable of determining a travel distance of said blade based upon a bevel angle of the blade relative to the horizontal plane of said base.

15. The saw of claim 1 further comprising a motor and a switch capable of actuating said motor to position said sawhead along said chopping pivot axis.

16. The saw of claim 15 wherein said chopping pivot axis has a defined length including an end location and wherein said motor is configured to determine either a load on said motor or to provide an encoder count frequency to determine whether said motor has positioned said saw at said end location.

17. The saw of claim 1 wherein displacement along said chopping pivot axis is prevented when said saw is rotating.

18. The saw of claim 1 wherein said displacement along said chopping pivot axis is prevented when said saw is engaged with a workpiece.

19. The saw of claim 1 wherein said saw is configured such that after said saw has reached a first predetermined cutting position and is subsequently positioned to a second predetermined cutting position, said sawhead is returned to a predetermined position along said chopping pivot axis after some period of time.

20. The saw of claim 19 wherein the saw is further capable of linear travel in a direction perpendicular to the chopping pivot axis and wherein said position of said saw along said linear travel is accounted for in determining when to return said saw at a predetermined position along said chopping pivot axis.

21. The saw of claim 19 including an override switch to prevent said saw from resetting to a predetermined position along said chopping pivot axis.

22. The saw of claim 1 including a reset switch to reset said saw to a predetermined position along said chopping pivot axis.

23. The saw of claim 1 wherein said saw, upon being powered, locates said saw to a predetermined position along said chopping pivot axis.

24. The saw of claim 1 wherein said saw, upon being powered, drives said saw along the entirety of said chopping pivot axis and locates said saw along a predetermined position along said chopping pivot axis.

25. The saw of claim 1 including a torsion spring configured to reposition said saw from a cutting position to a non-cutting position wherein said spring is further configured to expand and/or contract and not prevent displacement of said sawhead along said chopping pivot axis.

26. The saw of claim 1 including a mechanical switch configured to allow for displacement along said chopping pivot axis.

27. The saw of claim 1 further including a storage medium having stored thereon instruction that when executed by a machine result in the following operations:
    determining a bevel angle of said blade relative to said horizontal plane, said horizontal plane defining an opening therein;
    determining the free travel of said blade at said angle with said opening;
    calculating a total travel distance of said blade with respect to said opening; and
    determining the total travel distance of said blade with respect to said opening.

28. The saw of claim 1, wherein said horizontal plane is defined by a turntable and said turntable and sawhead are rotatable around said base to provide miter cuts.

29. An article comprising a storage medium having stored thereon instruction that when executed by a machine result in the following operations on a saw including a base portion including a horizontal plane configured to support a workpiece and a sawhead including a blade pivotably connected to said base, wherein said pivotable connection of said sawhead to said base defines a chopping pivot axis therethrough, and wherein said sawhead is rotatable around said chopping pivot axis towards the workpiece and said sawhead is lateral displaceable back and forth along said chopping pivot axis and parallel to the rotational axis at the center of the saw blade, comprising
    detecting a cutting location of a workpiece;
    moving a sawhead including said blade back and forth along said chopping pivot axis and parallel to the rotational axis at the center of the saw blade, wherein said lateral displacement is enabled by said pivotable connection, to align said blade with said cutting location.

30. The article of claim 29, wherein said instructions that when executed by said machine result in the following additional operations:
    taking at least one picture of said workpiece;
    storing said picture in memory;
    determining said cutting location from said picture.

31. The article of claim 29, wherein said instructions that when executed by said machine result in the following additional operations:
    emitting light onto a workpiece;
    detecting incident light reflected from said workpiece;
    determining said cutting location from said reflected incident light.

* * * * *